(12) United States Patent
Von Novak et al.

(10) Patent No.: US 10,734,841 B2
(45) Date of Patent: Aug. 4, 2020

(54) SYSTEM AND METHOD FOR FACILITATING AVOIDANCE OF WIRELESS CHARGING CROSS CONNECTION

(71) Applicant: QUALCOMM Incorporated, San Diego, CA (US)

(72) Inventors: William H. Von Novak, San Diego, CA (US); Edward Kallal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 410 days.

(21) Appl. No.: 15/599,290

(22) Filed: May 18, 2017

(65) Prior Publication Data

US 2017/0256979 A1    Sep. 7, 2017

Related U.S. Application Data

(62) Division of application No. 14/029,689, filed on Sep. 17, 2013, now Pat. No. 9,660,478.

(Continued)

(51) Int. Cl.
*H02J 7/00* (2006.01)
*H02J 50/12* (2016.01)
(Continued)

(52) U.S. Cl.
CPC .............. *H02J 50/12* (2016.02); *H02J 7/025* (2013.01); *H02J 50/40* (2016.02); *H04B 5/0031* (2013.01); *H04B 5/0037* (2013.01)

(58) Field of Classification Search
CPC .. H02J 7/025; H02J 50/12; H02J 50/80; H02J 5/005; H02J 50/60; H02J 50/90;

(Continued)

(56) References Cited

U.S. PATENT DOCUMENTS 8,044,804 B1    10/2011    McReynolds
8,060,011 B2    11/2011    Jin
(Continued)

FOREIGN PATENT DOCUMENTS

CN    101330230 A    12/2008
CN    101572444 A    11/2009
(Continued)

OTHER PUBLICATIONS

International Search Report and Written Opinion—PCT/US2013/073559—ISA/EPO—dated Mar. 27, 2014.

*Primary Examiner* — Binh C Tat
(74) *Attorney, Agent, or Firm* — Polsinelli LLP

(57) ABSTRACT

A system and method for charging a chargeable device is provided. The system can include a wireless charger including a wireless power antenna and a wireless power transmitter coupled to the wireless power antenna and configured to generate a wireless charging field in at least one charging region. The wireless charging field includes a plurality of power signals. The wireless charger further includes a communication antenna and a transceiver coupled to the communication antenna and configured to communicate with the chargeable device via the communication antenna. The wireless charger further includes a controller configured to facilitate avoidance of cross connection of the chargeable device with the wireless charger and at least one other wireless charger in which the chargeable device receives power from the wireless power transmitter of the wireless charger while communicating with at least one other wireless charger. The system can include a chargeable device including a controller configured to generate a load pulse configured to be received by the wireless charger.

11 Claims, 13 Drawing Sheets

Related U.S. Application Data

(60) Provisional application No. 61/776,749, filed on Mar. 11, 2013, provisional application No. 61/736,143, filed on Dec. 12, 2012.

(51) Int. Cl.
*H02J 50/40* (2016.01)
*H04B 5/00* (2006.01)
*H02J 7/02* (2016.01)

(58) Field of Classification Search
CPC .. H02J 50/50; H02J 50/70; H02J 50/40; H02J 9/02; H02J 50/20; H02J 50/10; H02J 7/34; H02J 9/065; H02J 50/30; H02J 7/00034; H02J 13/0017; H02J 2310/48; H02J 50/15; H02J 7/0027; H02J 7/0068; H02J 7/345; H02J 9/061; H02J 2310/40; H02J 50/00; H02J 7/0042; H02J 50/05; H02J 50/23; H02J 7/02; H02J 7/027; H02J 7/35; B60L 53/126; B60L 2210/30; B60L 2210/40; B60L 53/60; H04B 5/0037; H04B 5/0081; H04B 1/385; Y02T 10/7005; Y02T 90/122; Y02T 90/121; Y02T 90/16; Y04S 20/221; Y02B 70/3216
USPC .................................... 320/106–115
See application file for complete search history.

(56) References Cited

U.S. PATENT DOCUMENTS

| | | | |
|---|---|---|---|
| 8,185,755 B2 | 5/2012 | Yamasuge | |
| 8,248,026 B2 | 8/2012 | Sip | |
| 2006/0038719 A1 | 2/2006 | Pande et al. | |
| 2009/0108805 A1 | 4/2009 | Liu et al. | |
| 2009/0243397 A1 | 10/2009 | Cook et al. | |
| 2009/0264069 A1 | 10/2009 | Yamasuge | |
| 2009/0312046 A1 | 12/2009 | Clevenger et al. | |
| 2010/0156347 A1 | 6/2010 | Lee et al. | |
| 2010/0176934 A1 | 7/2010 | Chou et al. | |
| 2010/0181961 A1* | 7/2010 | Novak .................... | H02J 7/025 320/108 |
| 2010/0201201 A1 | 8/2010 | Mobarhan et al. | |
| 2010/0277003 A1 | 11/2010 | Von Novak et al. | |
| 2010/0311328 A1 | 12/2010 | Kargl et al. | |
| 2011/0025264 A1 | 2/2011 | Mochida et al. | |
| 2011/0093139 A1 | 4/2011 | Arms et al. | |
| 2011/0115432 A1 | 5/2011 | El-Maleh et al. | |
| 2011/0254503 A1 | 10/2011 | Widmer et al. | |
| 2011/0279226 A1 | 11/2011 | Chen et al. | |
| 2012/0007437 A1 | 1/2012 | Fells et al. | |
| 2012/0039102 A1 | 2/2012 | Shinoda | |
| 2012/0098483 A1 | 4/2012 | Patel | |
| 2012/0119587 A1 | 5/2012 | Cheon et al. | |
| 2012/0139356 A1 | 6/2012 | Jung et al. | |
| 2012/0223585 A1 | 9/2012 | Urano | |
| 2012/0242160 A1* | 9/2012 | Tseng ................... | H04B 5/0037 307/104 |
| 2012/0280650 A1 | 11/2012 | Kim et al. | |
| 2012/0286730 A1 | 11/2012 | Bonny | |
| 2012/0293118 A1* | 11/2012 | Kim ........................ | H02J 5/005 320/108 |
| 2012/0309306 A1 | 12/2012 | Kim et al. | |
| 2012/0326658 A1 | 12/2012 | Kim et al. | |
| 2012/0326660 A1 | 12/2012 | Lu et al. | |
| 2012/0329405 A1 | 12/2012 | Lee et al. | |
| 2013/0038272 A1 | 2/2013 | Sagata | |
| 2013/0328417 A1 | 12/2013 | Takeuchi | |
| 2014/0035391 A1 | 2/2014 | Kitani et al. | |
| 2014/0062395 A1 | 3/2014 | Kwon et al. | |
| 2014/0159651 A1 | 6/2014 | Von Novak et al. | |
| 2014/0159653 A1 | 6/2014 | Von Novak et al. | |

FOREIGN PATENT DOCUMENTS

| | | |
|---|---|---|
| CN | 101983467 A | 3/2011 |
| CN | 102027654 A | 4/2011 |
| CN | 102555832 A | 7/2012 |
| DE | 102011100095 A1 | 10/2012 |
| EP | 2244351 A2 | 10/2010 |
| JP | 2009213295 A | 9/2009 |
| JP | 2009261157 A | 11/2009 |
| JP | 2010104203 A | 5/2010 |
| JP | 2010259172 A | 11/2010 |
| JP | 2011078191 A | 4/2011 |
| JP | 2011114886 A | 6/2011 |
| WO | WO-2007042953 A2 | 4/2007 |
| WO | 2010035545 A1 | 4/2010 |
| WO | WO-2010093719 | 7/2010 |
| WO | WO-2010093719 | 8/2010 |
| WO | 2010125864 A1 | 11/2010 |
| WO | 2012015838 A2 | 2/2012 |
| WO | WO-2012037279 A1 | 3/2012 |
| WO | WO-2012042902 A1 | 4/2012 |
| WO | WO-2012086048 A1 | 6/2012 |
| WO | WO-2012111271 A1 | 8/2012 |
| WO | WO-2012141239 A1 | 10/2012 |
| WO | WO-2012164973 A1 | 12/2012 |
| WO | WO-2013089519 A1 | 6/2013 |
| WO | WO-2013128597 A1 | 9/2013 |

* cited by examiner

SYSTEM AND METHOD FOR FACILITATING AVOIDANCE OF WIRELESS CHARGING CROSS CONNECTION

CROSS-REFERENCE TO RELATED APPLICATIONS

This application is a division of U.S. application Ser. No. 14/029,689, filed Sep. 17, 2013, now U.S. Pat. No. 9,660,478, issued May 23, 2017, which claims the benefit of priority to U.S. Provisional Application No. 61/776,749, filed on Mar. 11, 2013, and U.S. Provisional Application No. 61/736,143, filed on Dec. 12, 2012, each of which is incorporated in its entirety by reference herein.

FIELD

The present invention relates generally to wireless power. More specifically, the disclosure is directed to systems, methods, and devices for establishing communications between a wireless power receiver and a wireless power transmitter where the receiver may be positioned within the wireless charging region of the transmitter but is capable of establishing communications with one or more additional wireless power transmitters.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a wireless charger for charging a chargeable device. The wireless charger comprises a wireless power antenna. The wireless charger further comprises a wireless power transmitter coupled to the wireless power antenna and configured to generate a wireless charging field in at least one charging region. The wireless charging field comprises a plurality of power signals. The wireless charger further comprises a communication antenna and a transceiver coupled to the communication antenna and configured to communicate with the chargeable device via the communication antenna. The wireless charger further comprises a controller configured to facilitate avoidance of cross connection of the chargeable device with the wireless charger and at least one other wireless charger in which the chargeable device receives power from one of the wireless charger or the at least one other wireless charger while communicating with the other of the wireless charger or the at least one other wireless charger.

Another aspect of the disclosure provides a wireless charger for charging a chargeable device. The wireless charger comprises means for generating a wireless charging field in at least one charging region. The wireless charging field comprises a plurality of power signals. The wireless charger further comprises means for communicating with the chargeable device. The wireless charger further comprises means for facilitating avoidance of cross connection of the chargeable device with the wireless charger and at least one other wireless charger in which the chargeable device receives power from one of the wireless charger or the at least one other wireless charger while communicating with the other of the wireless charger or the at least one other wireless charger.

Another aspect of the disclosure provides a non-transitory computer-readable medium comprising code that, when executed, causes a wireless charger to generate a wireless charging field in at least one charging region. The wireless charging field comprises a plurality of power signals. The medium further comprises code that, when executed, causes the wireless charger to communicate with the chargeable device. The medium further comprises code that, when executed, causes the wireless charger to facilitate avoidance of cross connection of the chargeable device with the wireless charger and at least one other wireless charger in which the chargeable device receives power from one of the wireless charger or the at least one other wireless charger while communicating with the other of the wireless charger or the at least one other wireless charger.

One aspect of the disclosure provides a chargeable device comprising a wireless power antenna configured to receive power from a wireless charger. The chargeable device further comprises a wireless power receiver coupled to the wireless power antenna. The chargeable device further comprises a communication antenna and a transceiver coupled to the communication antenna and configured to communicate with the wireless charger via the communication antenna. The chargeable device further comprises a controller configured to generate a load pulse configured to be received by the wireless charger.

Another aspect of the disclosure provides a chargeable device comprising means for receiving power from a wireless charger. The chargeable device further comprises means for communicating with the wireless charger. The chargeable device further comprises means for generating a load pulse configured to be received by the wireless charger.

Another aspect of the disclosure provides a non-transitory computer-readable medium comprising code that, when executed, causes a chargeable device to receive power from a wireless charger. The medium further comprises code that, when executed, causes the chargeable device to communicate with the wireless charger. The medium further comprises code that, when executed, causes the chargeable device to generate a load pulse configured to be received by the wireless charger.

Another aspect of the disclosure provides a method of facilitating avoidance of cross connection of a chargeable device in communication with a wireless charger. The method comprises varying power signals transmitted by a power transmitter of the wireless charger. The method further comprises receiving information regarding power signals received by the chargeable device. The method further comprises evaluating the information to determine whether the chargeable device is receiving the transmitted power signals from the wireless charger.

In certain such aspects, the method is performed by a wireless charger for charging a chargeable device. The wireless charger comprises a wireless power antenna. The wireless charger further comprises a wireless power transmitter coupled to the wireless power antenna and configured to generate a wireless charging field in at least one charging region. The wireless charging field comprises a plurality of power signals. The wireless charger further comprises a communication antenna and a transceiver coupled to the communication antenna and configured to communicate with the chargeable device via the communication antenna. The wireless charger further comprises a controller configured to vary the power signal, to receive the information, and to evaluate the information.

In certain aspects, the power signals transmitted by the power transmitter of the wireless charger are varied in a manner that is unique to the wireless charger. In certain aspects, varying the power signals comprises modulating an amplitude of the power signals transmitted by the power transmitter of the wireless charger. In certain aspects, the information is indicative of variations of the power signals received by the chargeable device. In certain aspects, varying the power signals comprises transmitting the power signals with a first variation pattern, and evaluating the information comprises comparing a second variation pattern of the power signals received by the chargeable device to the first variation pattern.

Another aspect of the disclosure provides a wireless charger configured for facilitating avoidance of cross connection of a chargeable device in communication with the wireless charger. The wireless charger comprises means for varying power signals transmitted by a power transmitter of the wireless charger. The wireless charger further comprises means for receiving information regarding power signals received by the chargeable device. The wireless charger further comprises means for evaluating the information to determine whether the chargeable device is receiving the transmitted power signals from the wireless charger.

Another aspect of the disclosure provides a non-transitory computer-readable medium comprising code that, when executed, causes a wireless charger to vary power signals transmitted by a power transmitter of the wireless charger. The medium further comprises code that, when executed, causes the wireless charger to receive information regarding power signals received by the chargeable device. The medium further comprises code that, when executed, causes the wireless charger to evaluate the information to determine whether the chargeable device is receiving the transmitted power signals from the wireless charger.

Another aspect of the disclosure provides a method of facilitating avoidance of cross connection of a chargeable device in communication with a wireless charger. The method comprises detecting an impedance change in a wireless charging field generated by the wireless charger. The impedance change is caused by the chargeable device entering the wireless charging field. The method further comprises evaluating the detected impedance change to determine whether the detected impedance change has a predetermined attribute. The method further comprises accepting out-of-band communication signals from chargeable devices during a first predetermined period of time after detecting an impedance change having the predetermined attribute.

In certain such aspects, the method is performed by a wireless charger for charging a chargeable device. The wireless charger comprises a wireless power antenna. The wireless charger further comprises a wireless power transmitter coupled to the wireless power antenna and configured to generate a wireless charging field in at least one charging region. The wireless charging field comprises a plurality of power signals. The wireless charger further comprises a communication antenna and a transceiver coupled to the communication antenna and configured to communicate with the chargeable device via the communication antenna. The wireless charger further comprises a controller configured to detect the impedance, to evaluate the detected impedance, and to accept the out-of-band communication signals.

Another aspect of the disclosure provides a wireless charger configured for facilitating avoidance of cross connection of a chargeable device in communication with the wireless charger. The wireless charger comprises means for detecting an impedance change in a wireless charging field generated by the wireless charger. The impedance change is caused by the chargeable device entering the wireless charging field. The wireless charger further comprises means for evaluating the detected impedance change to determine whether the detected impedance change has a predetermined attribute. The wireless charger further comprises means for accepting out-of-band communication signals from chargeable devices during a first predetermined period of time after detecting an impedance change having the predetermined attribute.

Another aspect of the disclosure provides a non-transitory computer-readable medium comprising code that, when executed, causes a wireless charger to detect an impedance change in a wireless charging field generated by the wireless charger. The impedance change is caused by the chargeable device entering the wireless charging field. The medium further comprises code that, when executed, causes the wireless charger to evaluate the detected impedance change to determine whether the detected impedance change has a predetermined attribute. The medium further comprises code that, when executed, causes the wireless charger to accept out-of-band communication signals from chargeable devices during a first predetermined period of time after detecting an impedance change having the predetermined attribute.

Another aspect of the disclosure provides a method of facilitating avoidance of cross connection of a chargeable device in communication with a wireless charger. The method comprises detecting a load pulse from a chargeable device. The method further comprises detecting an out-of-band communication signal from a chargeable device. The method further comprises evaluating a time period between detecting the load pulse and detecting the out-of-band communication signal. The method further comprises transmitting a response to the out-of-band communication signal if the time period is less than a predetermined time period.

In certain such aspects, the method is performed by a wireless charger for charging a chargeable device. The wireless charger comprises a wireless power antenna. The wireless charger further comprises a wireless power transmitter coupled to the wireless power antenna and configured to generate a wireless charging field in at least one charging region. The wireless charging field comprises a plurality of power signals. The wireless charger further comprises a communication antenna and a transceiver coupled to the communication antenna and configured to communicate with the chargeable device via the communication antenna. The wireless charger further comprises a controller configured to detect the load pulse, to detect the out-of-band communication signal, and to evaluate the time period.

Another aspect of the disclosure provides a wireless charger configured for facilitating avoidance of cross connection of a chargeable device in communication with the wireless charger. The wireless charger comprises means for detecting a load pulse from a chargeable device. The wireless charger further comprises means for detecting an out-of-band communication signal from a chargeable device. The wireless charger further comprises means for evaluating a time period between detecting the load pulse and detecting the out-of-band communication signal. The wireless charger further comprises means for transmitting a response to the out-of-band communication signal if the time period is less than a predetermined time period.

Another aspect of the disclosure provides a non-transitory computer-readable medium comprising code that, when executed, causes a wireless charger to detect a load pulse from a chargeable device. The medium further comprises code that, when executed, causes the wireless charger to detect an out-of-band communication signal from a chargeable device. The medium further comprises code that, when executed, causes the wireless charger to evaluate a time period between detecting the load pulse and detecting the out-of-band communication signal. The medium further comprises code that, when executed, causes the wireless charger to transmit a response to the out-of-band communication signal if the time period is less than a predetermined time period.

Another aspect of the disclosure provides a method of facilitating avoidance of cross connection of a chargeable device in communication with a wireless charger. The method comprises detecting an out-of-band communication signal from a chargeable device. The method further comprises communicating with at least one other wireless charger. The method further comprises determining whether the wireless charger or the at least one other wireless charger is to be connected to the chargeable device. In certain aspects, said determining comprises comparing received signal strength indication measurements of the wireless charger and the at least one other wireless charger, and identifying the wireless charger having the largest received signal strength indication measurement as the wireless charger to be connected to the chargeable device.

In certain such aspects, the method is performed by a wireless charger for charging a chargeable device. The wireless charger comprises a wireless power antenna. The wireless charger further comprises a wireless power transmitter coupled to the wireless power antenna and configured to generate a wireless charging field in at least one charging region. The wireless charging field comprises a plurality of power signals. The wireless charger further comprises a communication antenna and a transceiver coupled to the communication antenna and configured to communicate with the chargeable device via the communication antenna. The wireless charger further comprises a controller configured to detect the out-of-band communication signal, to communicate with the at least one other wireless charger, and to determine which wireless charger is to be connected to the chargeable device.

Another aspect of the disclosure provides a wireless charger configured for facilitating avoidance of cross connection of a chargeable device in communication with the wireless charger. The wireless charger comprises means for detecting an out-of-band communication signal from a chargeable device. The wireless charger further comprises means for communicating with at least one other wireless charger. The wireless charger further comprises means for determining whether the wireless charger or the at least one other wireless charger is to be connected to the chargeable device.

Another aspect of the disclosure provides a non-transitory computer-readable medium comprising code that, when executed, causes a wireless charger to detect an out-of-band communication signal from a chargeable device. The medium further comprises code that, when executed, causes the wireless charger to communicate with at least one other wireless charger. The medium further comprises code that, when executed, causes the wireless charger to determine whether the wireless charger or the at least one other wireless charger is to be connected to the chargeable device.

Another aspect of the disclosure provides a method of facilitating avoidance of cross connection of a chargeable device in communication with a wireless charger. The method comprises detecting a communication signal from a chargeable device. The method further comprises detecting an impedance change in a wireless charging field generated by the wireless charger within a first time period before or after receiving the communication signal. The impedance change is caused by the chargeable device entering the wireless charging field. The method further comprises accepting additional communication signals from the chargeable device in response to determining a signal strength of the communication signal is above a signal strength threshold and that an amount of the impedance change is above an impedance change threshold. In certain aspects, the communication signal is received via an out-of-band communication channel different than the wireless field, and wherein the communication signal is received during a beacon mode time period.

In certain such aspects, the method is performed by a wireless charger for charging a chargeable device. The wireless charger comprises a wireless power antenna. The wireless charger further comprises a wireless power transmitter coupled to the wireless power antenna and configured to generate a wireless charging field in at least one charging region. The wireless charging field comprises a plurality of power signals. The wireless charger further comprises a communication antenna and a transceiver coupled to the communication antenna and configured to communicate with the chargeable device via the communication antenna. The wireless charger further comprises a controller configured to detect the communication signal, to detect the impedance change, and to accept the additional communication signals.

Another aspect of the disclosure provides a wireless charger configured for facilitating avoidance of cross connection of a chargeable device in communication with a wireless charger. The wireless charger comprises means for detecting a communication signal from a chargeable device. The wireless charger further comprises means for detecting an impedance change in a wireless charging field generated by the wireless charger within a first time period before or after receiving the communication signal. The impedance change is caused by the chargeable device entering the wireless charging field. The wireless charger further comprises means for accepting additional communication signals from the chargeable device in response to determining a signal strength of the communication signal is above a signal strength threshold and that an amount of the impedance change is above an impedance change threshold.

Another aspect of the disclosure provides a non-transitory computer-readable medium comprising code that, when executed, causes a wireless charger to detect a communication signal from a chargeable device. The medium further comprises code that, when executed, causes the wireless charger to detect an impedance change in a wireless charging field generated by the wireless charger within a first time period before or after receiving the communication signal. The impedance change is caused by the chargeable device entering the wireless charging field. The medium further comprises code that, when executed, causes the wireless charger to accept additional communication signals from the chargeable device in response to determining a signal strength of the communication signal is above a signal strength threshold and that an amount of the impedance change is above an impedance change threshold.

Figure 1:
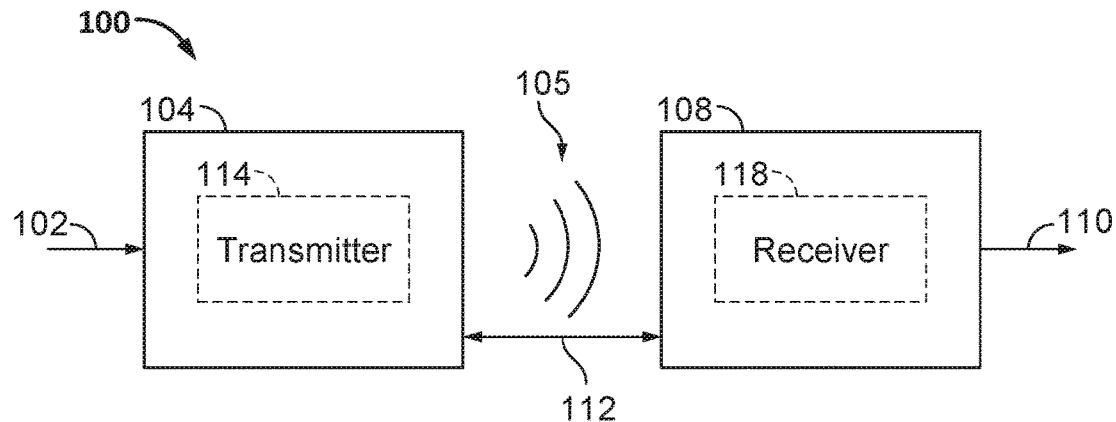
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

In some wireless power systems, and as will be described below, the transmitter and receiver communicate on a frequency other than that being used to transfer power. In some embodiments, it is desirable to establish this so-called out-of-band communication channel independent of the wireless power field used to transfer power. The out-of-band communication channel is useful to reduce the complexity of the in-band transmitter and receiver circuitry. Because in-band power transfer and the out-of-band communication channel have different characteristics, a receiver may be out of out of range for wireless power from a transmitter but within range for out-of-band communication. As a result, when multiple transmitters are present within a given space, cross connection can result, where a power transmitter sends power to a power receiver but connects its control signal to another power receiver, or a power receiver is powered by a power transmitter but has a control signal connected to another power transmitter. This condition can lead to unstable operation, loss of efficiency, and poor user experience. Thus, it is desirable to avoid such cross connection or to detect and remedy such cross connection and initiate proper communication among the various devices.

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving antenna" to achieve power transfer.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit antenna 114 for outputting an energy transmission. The receiver 108 further includes a receive antenna 118 for receiving or capturing energy from the energy transmission. The near-field may correspond to a region in which there are strong reactive fields resulting from the currents and charges in the transmit antenna 114 that minimally radiate power away from the transmit antenna 114. In some cases the near-field may correspond to a region that is within about one wavelength (or a fraction thereof) of the transmit antenna 114. The transmit and receive antennas 114 and 118 are sized according to applications and devices to be associated therewith. As described above, efficient energy transfer may occur by coupling a large portion of the energy in a field 105 of the transmit antenna 114 to a receive antenna 118 rather than propagating most of the energy in an electromagnetic wave to the far field. When positioned within the field 105, a "coupling mode" may be developed between the transmit antenna 114 and the receive antenna 118. The area around the transmit and receive antennas 114 and 118 where this coupling may occur is referred to herein as a coupling-mode region.

Figure 2:
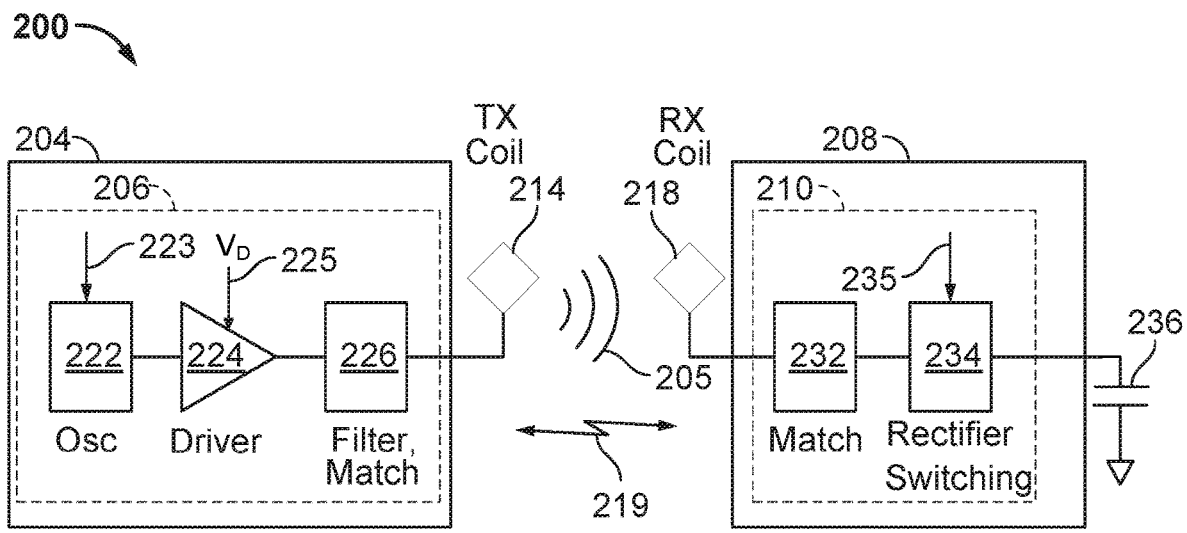
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit antenna 214 at, for example, a resonant frequency of the transmit antenna 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit antenna 214. As a result of driving the transmit antenna 214, the transmitter 204 may wirelessly output power at a level sufficient for charging or powering an electronic device. As one example, the power provided may be for example on the order of 300 milliWatts to 5 Watts to power or charge different devices with different power requirements. Higher or lower power levels may also be provided.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive antenna 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 206.

As described more fully below, receiver 208, that may initially have a selectively disablable associated load (e.g., battery 236), may be configured to determine whether an amount of power transmitted by transmitter 204 and received by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
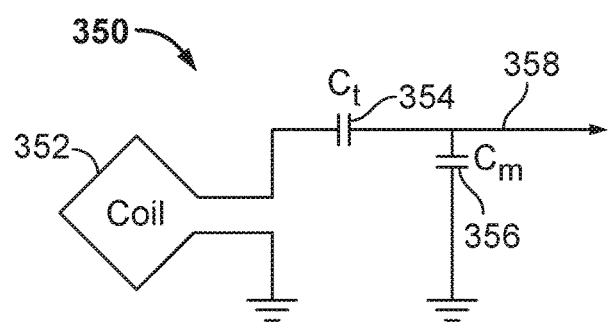
FIG. 3 is a schematic diagram of a portion of transmit circuitry or receive circuitry of FIG. 2 including a transmit or receive antenna, in accordance with exemplary embodiments of the invention.

FIG. 3 is a schematic diagram of a portion of transmit circuitry 206 or receive circuitry 210 of FIG. 2 including a transmit or receive antenna 352, in accordance with exemplary embodiments of the invention. As illustrated in FIG. 3, transmit or receive circuitry 350 used in exemplary embodiments including those described below may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, an antenna 352 is an example of a "power transfer component" of a type that is configured to wirelessly output and/or receive power. The antenna 352 may be configured to include an air core or a physical core such as a ferrite core (not shown). Air core loop antennas may be more tolerable to extraneous physical devices placed in the vicinity of the core. Furthermore, an air core loop antenna 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmit antenna 214 coil to the receive antenna 218 residing in the neighborhood where this field 105 is established rather than propagating the energy from the transmit antenna 214 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, capacitor 352 and capacitor 354 may be added to the transmit or receive circuitry 350 to create a resonant circuit that selects a signal 356 at a resonant frequency. Accordingly, for larger diameter antennas, the size of capacitance needed to sustain resonance may decrease as the diameter or inductance of the loop increases. Furthermore, as the diameter of the antenna increases, the efficient energy transfer area of the near-field may increase. Other resonant circuits formed using other components are also possible. As another non-limiting example, a capacitor may be placed in parallel between the two terminals of the antenna 350. For transmit antennas, a signal 358 with a frequency that substantially corresponds to the resonant frequency of the antenna 352 may be an input to the antenna 352.

In one embodiment, the transmitter 104 may be configured to output a time varying magnetic field with a frequency corresponding to the resonant frequency of the transmit antenna 114. When the receiver is within the field 105, the time varying magnetic field may induce a current in the receive antenna 118. As described above, if the receive antenna 118 is configured to be resonant at the frequency of the transmit antenna 118, energy may be efficiently transferred. The AC signal induced in the receive antenna 118 may be rectified as described above to produce a DC signal that may be provided to charge or to power a load.

Figure 4:
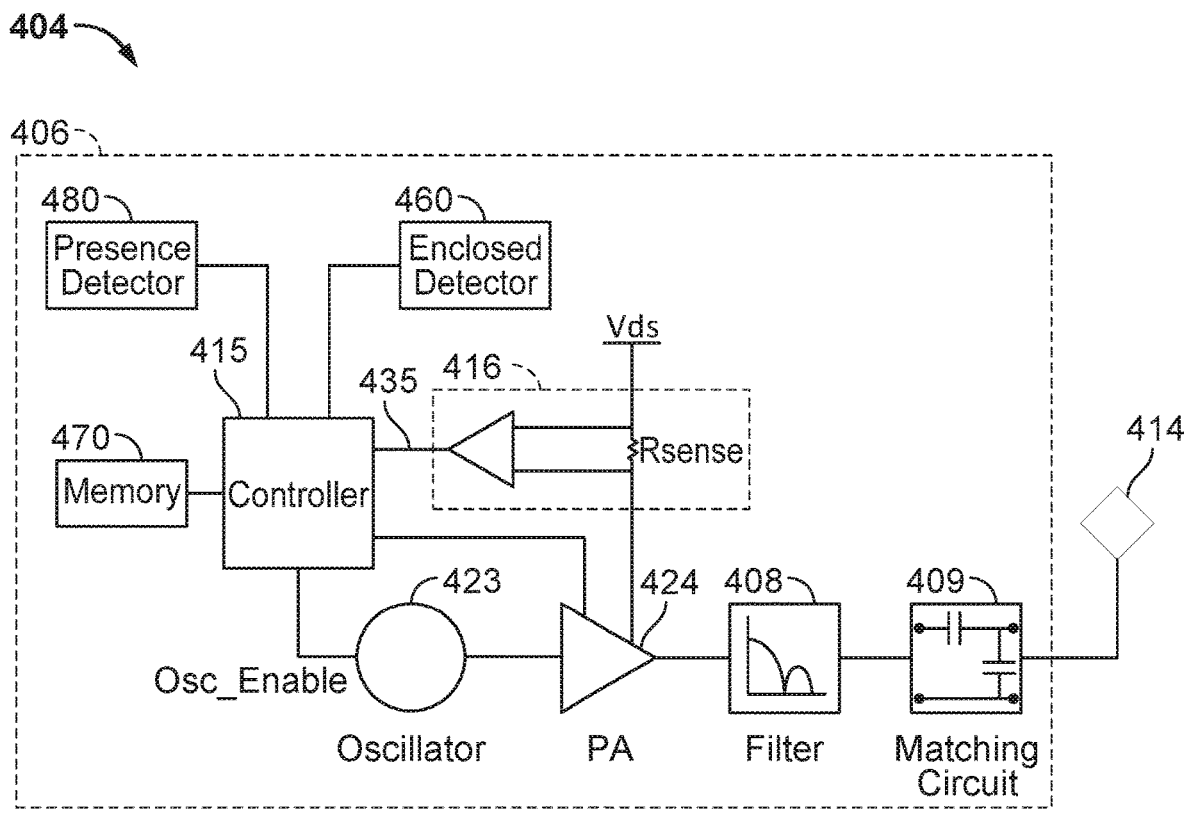
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit antenna 414. The transmit antenna 414 may be the antenna 352 as shown in FIG. 3. Transmit circuitry 406 may provide RF power to the transmit antenna 414 by providing an oscillating signal resulting in generation of energy (e.g., magnetic flux) about the transmit antenna 414. Transmitter 404 may operate at any suitable frequency. By way of example, transmitter 404 may operate at the 6.78 MHz ISM band.

Transmit circuitry 406 may include a fixed impedance matching circuit 409 for matching the impedance of the transmit circuitry 406 (e.g., 50 ohms) to the transmit antenna 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the antenna 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit antenna 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit antenna 414. By way of example, a load sensing circuit 416 monitors the current flowing to the driver circuit 424, that may be affected by the presence or absence of active receivers in the vicinity of the field generated by transmit antenna 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit antenna 414 may be implemented with a Litz wire or as an antenna strip with the thickness, width and metal type selected to keep resistive losses low. In a one implementation, the transmit antenna 414 may generally be configured for association with a larger structure such as a table, mat, lamp or other less portable configuration. Accordingly, the transmit antenna 414 generally may not need "turns" in order to be of a practical dimension. An exemplary implementation of a transmit antenna 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404. Further, the presence detector may be used to ensure that a device to be charged that is communicating with the transmitter 404 is the one that has been recently placed into the coverage area of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit antenna 414 may transmit at a specific frequency. In some cases, these regulations are meant to protect humans from electromagnetic radiation. However, there may be environments where a transmit antenna 414 is placed in areas not occupied by humans, or occupied infrequently by humans, such as, for example, garages, factory floors, shops, and the like. If these environments are free from humans, it may be permissible to increase the power output of the transmit antenna 414 above the normal power restrictions regulations. In other words, the controller 415 may adjust the power output of the transmit antenna 414 to a regulatory level or lower in response to human presence and adjust the power output of the transmit antenna 414 to a level above the regulatory level when a human is outside a regulatory distance from the electromagnetic field of the transmit antenna 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive antenna 218 that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
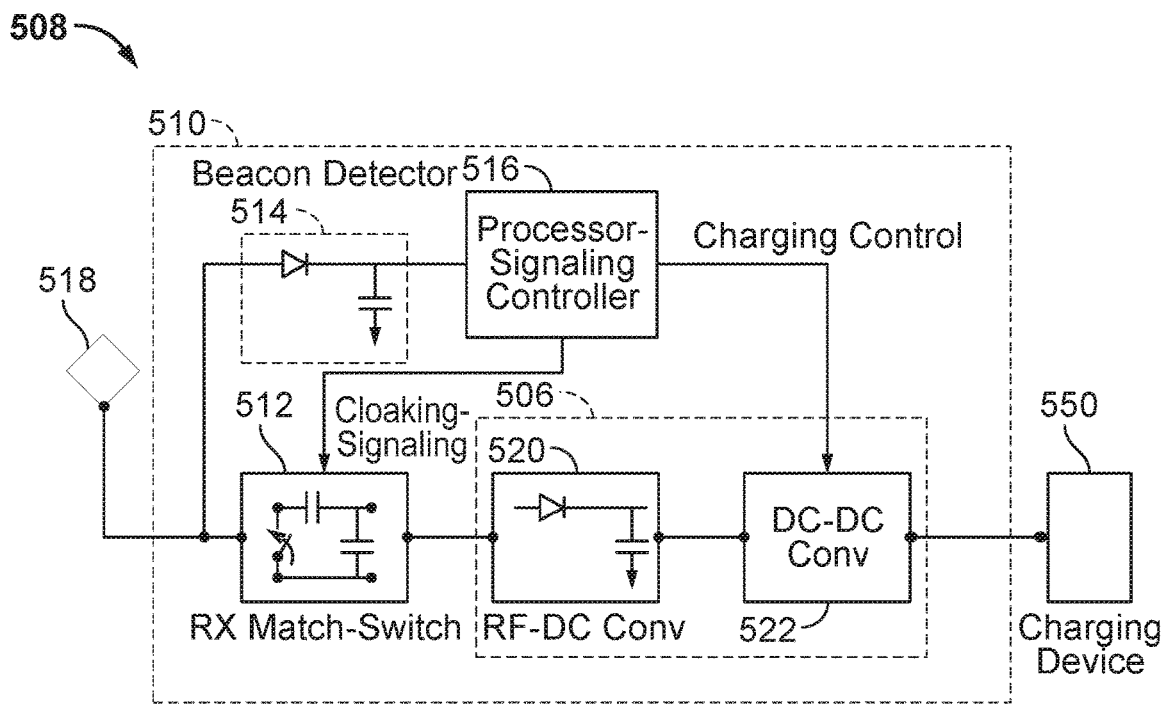
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive antenna 518. Receiver 508 further couples to device 550 for providing received power thereto. It should be noted that receiver 508 is illustrated as being external to device 550 but may be integrated into device 550. Energy may be propagated wirelessly to receive antenna 518 and then coupled through the rest of the receive circuitry 510 to device 550. By way of example, the chargeable device may include devices such as mobile phones, portable music players, laptop computers, tablet computers, computer peripheral devices, communication devices (e.g., Bluetooth devices), digital cameras, hearing aids (an other medical devices), and the like.

Receive antenna 518 may be tuned to resonate at the same frequency, or within a specified range of frequencies, as transmit antenna 414 (FIG. 4). Receive antenna 518 may be similarly dimensioned with transmit antenna 414 or may be differently sized based upon the dimensions of the associated device 550. By way of example, device 550 may be a portable electronic device having diametric or length dimension smaller than the diameter or length of transmit antenna 414. In such an example, receive antenna 518 may be implemented as a multi-turn coil in order to reduce the capacitance value of a tuning capacitor (not shown) and increase the receive coil's impedance. By way of example, receive antenna 518 may be placed around the substantial circumference of device 550 in order to maximize the antenna diameter and reduce the number of loop turns (i.e., windings) of the receive antenna 518 and the inter-winding capacitance.

Receive circuitry 510 may provide an impedance match to the receive antenna 518. Receive circuitry 510 includes power conversion circuitry 506 for converting a received RF energy source into charging power for use by the device 550. Power conversion circuitry 506 includes an RF-to-DC converter 520 and may also include a DC-to-DC converter 522. RF-to-DC converter 520 rectifies the RF energy signal received at receive antenna 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive antenna 518 to the power conversion circuitry 506 or alternatively for disconnecting the power conversion circuitry 506. Disconnecting receive antenna 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive antenna 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6:
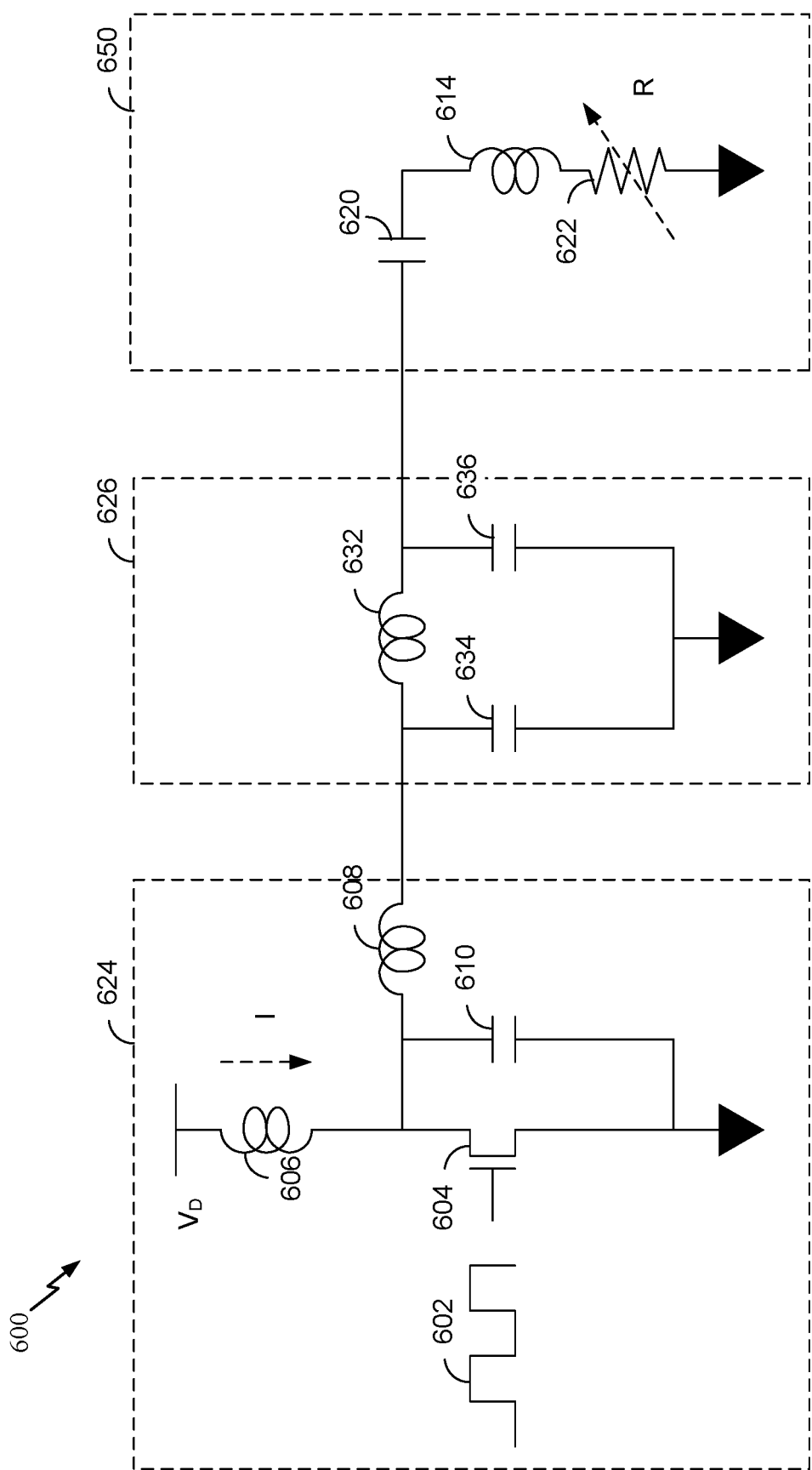
FIG. 6 is a schematic diagram of a portion of transmit circuitry that may be used in the transmit circuitry of FIG. 4.

FIG. 6 is a schematic diagram of a portion of transmit circuitry 600 that may be used in the transmit circuitry 406 of FIG. 4. The transmit circuitry 600 may include a driver circuit 624 as described above in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier, however, any suitable driver circuit 624 may be used in accordance with embodiments of the invention. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. To eliminate or reduce harmonics, the transmit circuitry 600 may include a filter circuit 626. The filter circuit 626 may be a three pole (capacitor 634, inductor 632, and capacitor 636) low pass filter circuit 626.

The signal output by the filter circuit 626 may be provided to a transmit circuit 650 comprising an antenna 614. The transmit circuit 650 may include a series resonant circuit having a capacitance 620 and inductance (e.g., that may be due to the inductance or capacitance of the antenna or to an additional capacitor component) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

Figure 7A:
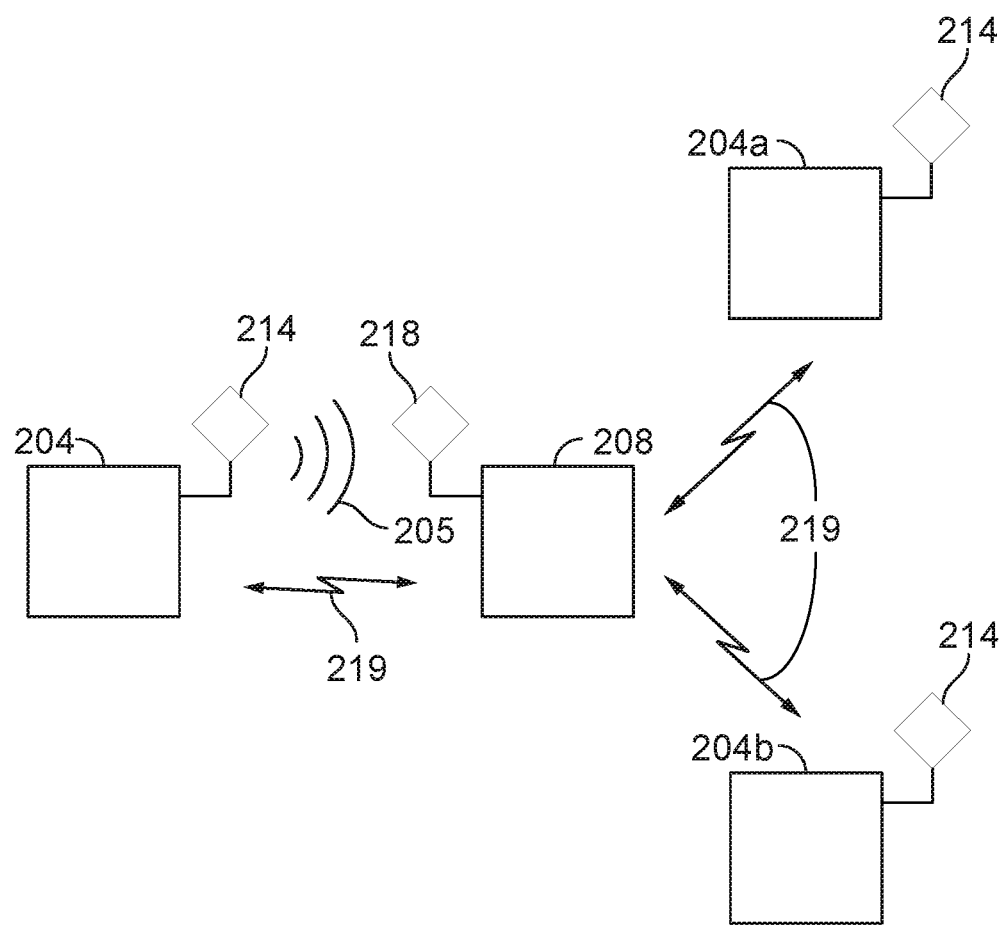
FIG. 7A is a functional block diagram of a receiver in the presence of multiple transmitters, in accordance with exemplary embodiments of the invention.

When multiple transmitters are within out-of-band communication range of a receiver, it is important to establish communications with the transmitter best suited for transferring wireless power to the receiver. Out-of-band communications between the transmitter and the receiver can be carried out over a separate communication channel from the wireless power transfer field, as described below. FIG. 7A is a functional block diagram depicting the case where a receiver 208 is located in proximity to multiple transmitters 204, 204a, and 204b. As shown, receiver 208 is located so as to receive wireless power from transmitter 204 via field 205. However, receiver 208 is capable of establishing an out-of-band communication channel 219 with transmitters 204, 204a, and 204b. Thus, if receiver 208 establishes channel 219 with transmitter 204a or 204b, any subsequent communications related to power transfer would be irrelevant. This situation may be referred to herein as a misconnection or cross connection.

Figure 7B:
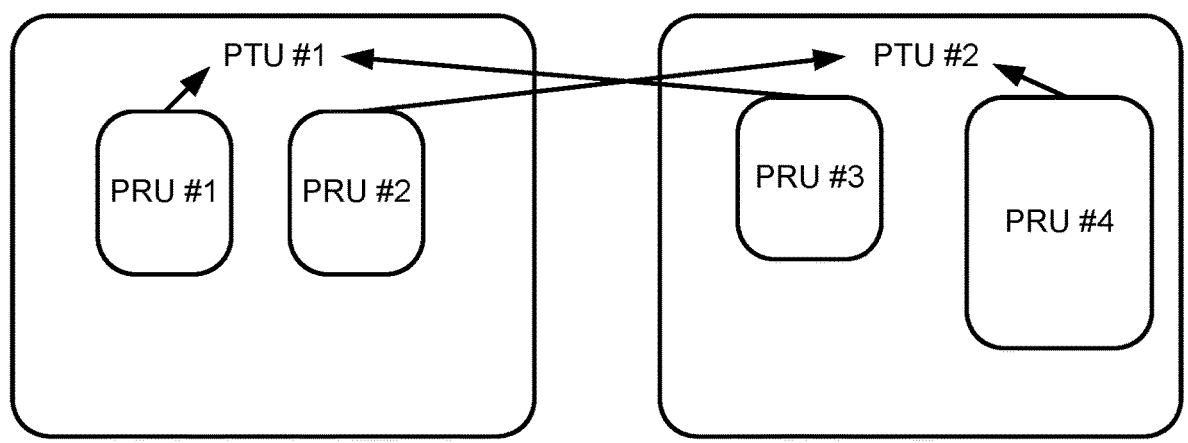
FIG. 7B schematically illustrates an example of cross connection among four receivers in the presence of two transmitters.

FIG. 7B is a block diagram of another example of cross connection in a system comprising two power transmitter units (PTU #1 and PTU #2) and four power receiver units (PRU #1, PRU #2, PRU #3, PRU #4). For example, a medium range communication system, e.g., Bluetooth Low Energy (BLE), can have a range of 10-50 meters potentially resulting in a condition in which a power receiver unit can connect to the wrong power transmitter unit. As shown in FIG. 7B, PRU #1 has correctly connected to PTU #1, and PRU #4 has correctly connected to PTU #2. However, PRU #2 has incorrectly connected (or cross connected) to non-co-located PTU #2 and PRU #3 has incorrectly connected (or cross connected) to non-co-located PTU #1. As shown in FIG. 7B, PRU #2 may have a communication connection to PTU #2 while having a wireless power connection to PTU #1, and PRU #3 may have a communication connection to PTU #1 while having a wireless power connection to PTU #2.

Wireless charging systems are expected to operate in various illustrative environments, some with multiple power transmission units and multiple power receiver units in which the problem of cross connections can arise. For example, a "solo" environment can comprise a single power transmission unit and a single power receiver unit, so no cross connection can result. As another example, a "residential" environment can comprise multiple (e.g., two) power transmission units spaced (for example, 10 meters) apart from one another and operated concurrently with one another. As another example, a "coffee shop" environment can comprise multiple (e.g., 10) power transmission units spaced (for example, 2 meters) from one another. Thus, there can be multiple power transmission units that are "visible" or detectable by most power receiver units in the vicinity, and a number (e.g., 5) of these power transmission units can be active at any given time. As another example, a "stadium" environment can comprise multiple (e.g., more than 1000) power transmission units spaced (for example, one meter) apart from one another (e.g., 1 per square meter). Thus, there can be many (e.g., 300) power transmission units "visible" or detectable by power receiver units within a distance range (for example, 10 meters).

Attempts to prevent incorrect corrections or cross connections may fail, for example, by incorrectly rejecting a co-located power receiving unit (false rejection), or by incorrectly allowing a cross-connected power receiving unit to remain connected (false acceptance). For false rejection, a chargeable device on a correct wireless charger is incorrectly rejected, and can be caused by excessive Z separation or by system instability. Potential results of such false rejections include, but are not limited to, long period of rejection (e.g., minutes) until the device is re-accepted, and system trip (e.g., shutdown of some or all functionality of the wireless charger) due to apparent measurement of the transmitter transmitting too much power without seeing a corresponding increase in received power. For false acceptance, a chargeable device on another wireless charger is incorrectly accepted by the wireless charger as its own. Such failures can be caused by good matching across wireless chargers or by coincident timing (e.g., power being restored to multiple wireless chargers at the same time).

Out-of-band communication (e.g., an advertisement) may be implemented through the use of any wireless communication protocol having a range of implementation (e.g., a proprietary communication protocol, a communication protocol established by a standards organization like IEEE, etc., IrDA, Wireless USB, Z-Wave, ZigBee, Bluetooth Low Energy (BLE), and/or the like). Having multiple power transmitting units within this range can contribute to the problem of cross connection.

Figure 7C:
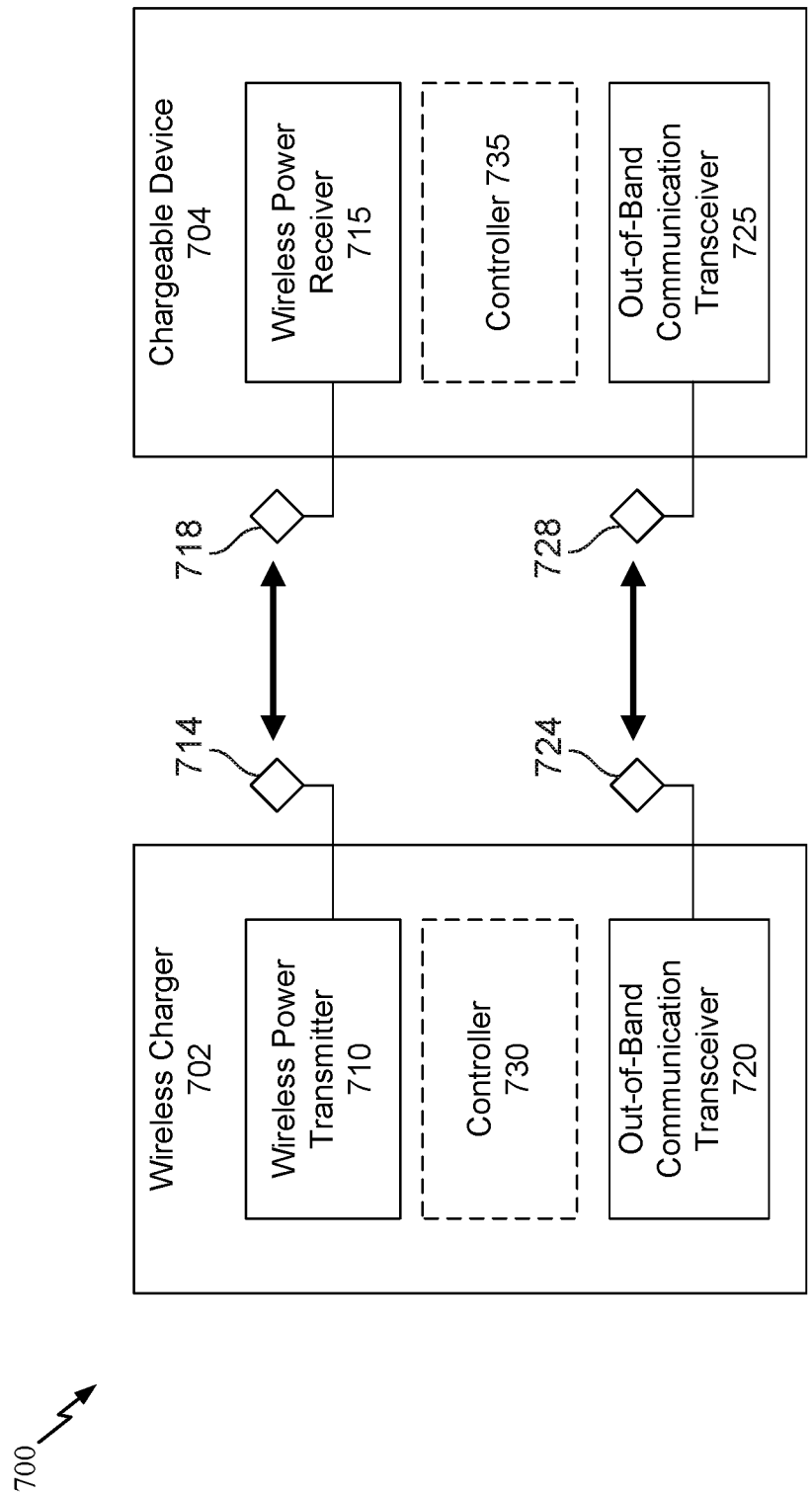
FIG. 7C is a block diagram of a wireless charging system that may incorporate the transmit circuitry of FIG. 4 and the receive circuitry of FIG. 5.

FIG. 7C is a block diagram of a wireless charging system 700 capable of out-of-band communications that may incorporate the transmit circuitry 406 of FIG. 4 and the receive circuitry 510 of FIG. 5. The wireless charging system 700 may comprise a wireless charger 702 (e.g., a power transmitter unit) and a chargeable device 704 (e.g., a power receiver unit).

The wireless charger 702 may comprise a wireless power antenna 714 and a wireless power transmitter 710 coupled to the wireless power antenna 714 and configured to generate a wireless charging field in at least one charging region (e.g., one, two, three, or more charging regions). The wireless charging field can comprise a plurality of power signals. The wireless charger 702 can further comprise a communication antenna 724 and a transceiver 720 (e.g., an out-of-band communication transceiver) coupled to the communication antenna 724 and configured to communicate with the chargeable device via the communication antenna 724. The wireless charger 702 can further comprise a controller 730 configured to facilitate avoidance of cross connection of the chargeable device 704 with the wireless charger 702 and at least one other wireless charger (e.g., to prevent cross connection, to reduce a probability of cross connection, to terminate a cross connection). In such cross connection, the chargeable device 704 would receive power from one of the wireless charger 702 or the at least one other wireless charger while the chargeable device 704 is communicating with the other of the wireless charger 702 or the at least one other wireless charger.

In an embodiment, the transmit antenna 714 may be similar to the transmit coil 414 of FIG. 4, and the wireless power transmitter 710 of the wireless charger 702 may be similar to and/or include the same functionality as the transmit circuitry 406 of FIG. 4. In an embodiment, the wireless power transmitter 710 may be configured to transmit power wirelessly to charge the chargeable device 704 (e.g., to the wireless power receiver 715 of the chargeable device 704) by generating the wireless charging field in the at least one charging region.

The chargeable device 704 may comprise a wireless power antenna 718 configured to receive power from a wireless charger (e.g., the wireless charger 702) and a wireless power receiver 715 coupled to the wireless power antenna 718. The chargeable device 704 can further comprise a communication antenna 728 and a transceiver 725 (e.g., an out-of-band communication transceiver) coupled to the communication antenna 728 and configured to communication with the wireless charger (e.g., wireless charger 702) via the communication antenna 728. The chargeable device 704 can further comprise a controller 735 configured to facilitate avoidance of cross connection of the chargeable device 704 with the wireless charger 702 and at least one other wireless charger (e.g., to prevent cross connection, to reduce a probability of cross connection, to terminate a cross connection). For example, as described in more detail below, the controller 735 can be configured to generate a load pulse configured to be received by the wireless charger (e.g., wireless charger 702).

In an embodiment, the chargeable device 704 may be similar to the chargeable device 550 of FIG. 5, and the wireless power receiver 715 may be similar to and/or include the same functionality as the receive circuitry 510 of FIG. 5. Likewise, the wireless power receiver 715 may be coupled to a receive coil 718. The receive coil 718 may be similar to the receive coil 518 of FIG. 5.

As shown in FIG. 7C, the out-of-band communication transceiver 720 may be coupled to antenna 724 and the out-of-band communication transceiver 725 may be coupled to antenna 728. In an embodiment, the out-of-band communication transceivers 720 and 725, via antennas 724 and 728, may be used to establish a connection between the wireless charger 702 and the chargeable device 704 such that the chargeable device 704 can receive power wirelessly from the wireless charger 702 in order to charge its battery or similar device. The out-of-band communication (e.g., an initial notification of the placement of the device to be charged, an advertisement) may be implemented through the use of any wireless communication protocol (e.g., a proprietary communication protocol, a communication protocol established by a standards organization like IEEE, etc.). For example, IrDA, Wireless USB, Z-Wave, ZigBee, Bluetooth Low Energy (BLE), and/or the like may be used.

Figure 8:
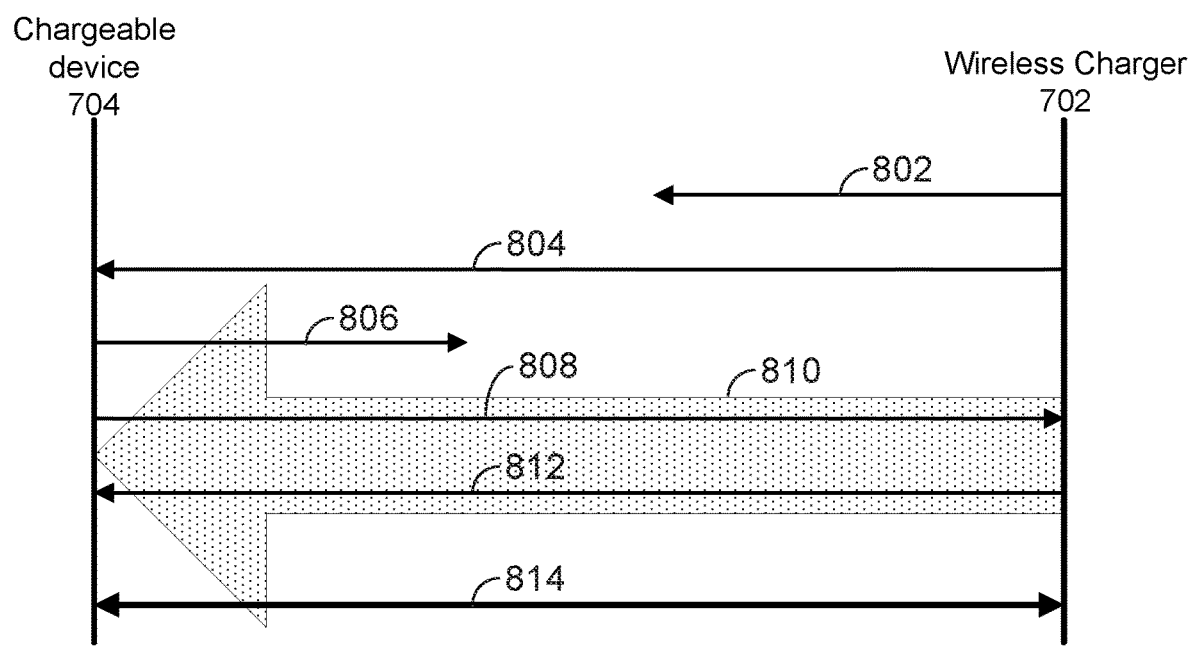
FIG. 8 is a timing and signal flow diagram of communications between a wireless charger and a chargeable device, such as the wireless charger and the chargeable device of FIG. 7A, to establish a connection between the wireless charger and the chargeable device.

To better understand the resolution techniques disclosed herein, it is helpful to understand an exemplary method for establishing an out-of-band communication channel. FIG. 8 is a timing and signal flow diagram of communications between a wireless charger and a chargeable device, such as the wireless charger 702 (e.g., power transmitter unit) and the chargeable device 704 (e.g., power receiver unit), to establish a connection between the wireless charger and the chargeable device. The wireless charger 702 may transmit a power pulse 802 (e.g., a beacon signal), where the power pulse 802 can be used to supply power to a chargeable device, like chargeable device 704, to charge the chargeable device. The wireless charger 702 may transmit the power pulse 802 in order to detect a chargeable device. As illustrated in FIG. 8, the power pulse 802 was transmitted, but no chargeable device was in range of the power pulse 802. The wireless charger 702 may wait a period of time before transmitting another power pulse 804. For example, the wireless charger 702 may wait 1 second between pulses. Upon transmitting the power pulse 802 and/or 804, the wireless charger 702 may start a general connection establishment procedure. As illustrated in FIG. 8, the power pulse 804 was transmitted and in range of the chargeable device 704.

Once the wireless charger 702 detects a load on the power pulse 804, the wireless charger 702 begins scanning for a broadcast from a device, like the chargeable device 704. In this manner, the wireless charger 702 may conserve power by only scanning for a broadcast once it detects a load on a power pulse. In an embodiment, the power pulse 804 causes the chargeable device 704 to generate a broadcast (e.g., a processor of the chargeable device 704 may generate the broadcast). As an example, the broadcast 806 may be message(s) transmitted over Bluetooth Low Energy channels. The chargeable device 704 may transmit the broadcast 806 with the wireless charger 702 as the intended recipient. If the broadcast 806 does not reach the wireless charger 702 (as depicted in FIG. 8), then the chargeable device 704 may generate and transmit another broadcast 808. For example, the chargeable device 704 may wait 20 ms before sending another broadcast 808. If a connection is not established within a certain time frame, such as 10 seconds, the chargeable device 704 may exit a connectable mode and stop any charging that may have started. In this manner, the chargeable device 704 may conserve power by only generating and transmitting a broadcast 806 and/or 808 once it receives a power pulse 802 and/or 804 from the wireless charger 702.

Note that there are numerous situations in which a misconnection (e.g., cross connection) may occur. For example, another device besides chargeable device 704, or an object in the vicinity of the wireless charger 702, may cause the wireless charger 702 to detect a load and begin scanning for a broadcast. As another example, some chargers may continually scan for a broadcast independent of the timing of power pulses 802 and 804. As yet another example, some chargeable devices may continually broadcast independent of the timing of power pulses 802 and 804. As yet another example, a wireless charger may respond to a broadcast before the charger which originated a power pulse, preempting the initialization of communications. Consequently, in these and other situations the wireless charger 702 may inadvertently establish communications with a chargeable device located outside an effective charging region, resulting in a misconnection or cross connection.

Once the wireless charger 702 receives the broadcast 808, the wireless charger may transmit a connection request 812 to the chargeable device 704. If the chargeable device 704 accepts the connection request 812, then a connection 814 is established between the wireless charger 702 and the chargeable device 704.

Note that during the connection process illustrated in FIG. 8, the wireless charger 702 may continue to transmit power 810, such as via the power pulse 802 and/or 804, in order to charge the chargeable device 704. In some aspects, the chargeable device 704 may be in a charger powered mode, and the power 810 would allow the chargeable device 704 to remain active in order to establish a connection with the wireless charger 702. Once the wireless charger 702 determines that a connection cannot be established, that the chargeable device 704 is now in a self-powered mode, and/or that the chargeable device 704 otherwise does not need the power transmitted from the wireless charger 702, then the wireless charger 702 may stop transmitting the power 810.

If a connection is lost at any point, the chargeable device 704 may attempt to reconnect with the wireless charger 702. Alternatively, the chargeable device 704 may wait until it receives another power pulse 802 and/or 804 from the wireless charger 702.

Several methods disclosed herein may be used to assist in the correct connection of out-of-band signaling between a transmitter and a receiver, and/or ascertain whether an out-of-band communication channel has been improperly established between a transmitter and a receiver (e.g., a misconnection or a cross connection). These methods are referred to herein as resolution methods. Some of these resolution methods do not necessarily guarantee an out-of-band communication channel has been established between the optimal transmitter and receiver. Instead, some methods tend to inferentially support or undermine the propriety of the established communication channel. Accordingly, one or more of these resolutions methods may be used in a wireless power transfer system to facilitate avoidance of cross connection (e.g., to prevent cross connection, to reduce a probability of cross connection, to terminate a cross connection). Further, the output of these resolution methods may be compared against a threshold for that particular method and/or combined with other methods disclosed herein. The outputs of these methods may be weighted and used in a probabilistic or fuzzy logic type model to evaluate whether there has been a misconnection and out-of-band communication should attempt to reconnect.

The resolution methods may be carried out by a controller (e.g., controller 415 of FIG. 4, processor 416 of FIG. 5, controllers 730, 735 of FIG. 7). In one embodiment, the resolution method(s) may be evaluated by a transmitter-side controller with receiver-side measurements transmitted over the out-of-band communication channel. In another embodiment, the resolution methods may be evaluated either transmitter-side or receiver-side, with the resulting output(s) transmitted via the out-of-band communication channel to the transmitter (or receiver). Further, upon identifying a misconnection (e.g., cross connection) but before dropping the out-of-band communication channel, the local controller may notify the remote controller of the misconnection. In certain embodiments, the controller can provide additional time to allow the connection to be made to resolve cross connections, e.g., adding to the total time between placement of the chargeable device to resolving any cross connections. In particular, congested environments with many wireless chargers and many chargeable devices can take a significant amount of time to resolve any cross connections.

A "lost power algorithm" can use power measurements (e.g., AC or DC) compared to reported power at the chargeable device to calculate an amount of "lost" power, with the intent to shut down power to the wireless charger when too much power is unaccounted for, thereby helping to prevent heating of metallic objects placed on the wireless charger during operation. To accurately measure lost power, an accurate count of the number of devices receiving power is desirable, but such an accurate count may not be available when cross connections occur. Thus, cross connections can result in unexpected shutdowns if a lost power algorithm is utilized, thereby degrading the user experience. By leaving "off" any chargeable devices suspected of being cross connected to multiple power chargers, the amount of power drawn by the chargeable device and the odds of a power trip due to lost power are reduced. However, since the chargeable device will not be charging under such circumstances, the user experience may suffer. Thus, in certain embodiments, the resolution techniques described herein can improve the user experience.

Figure 9:
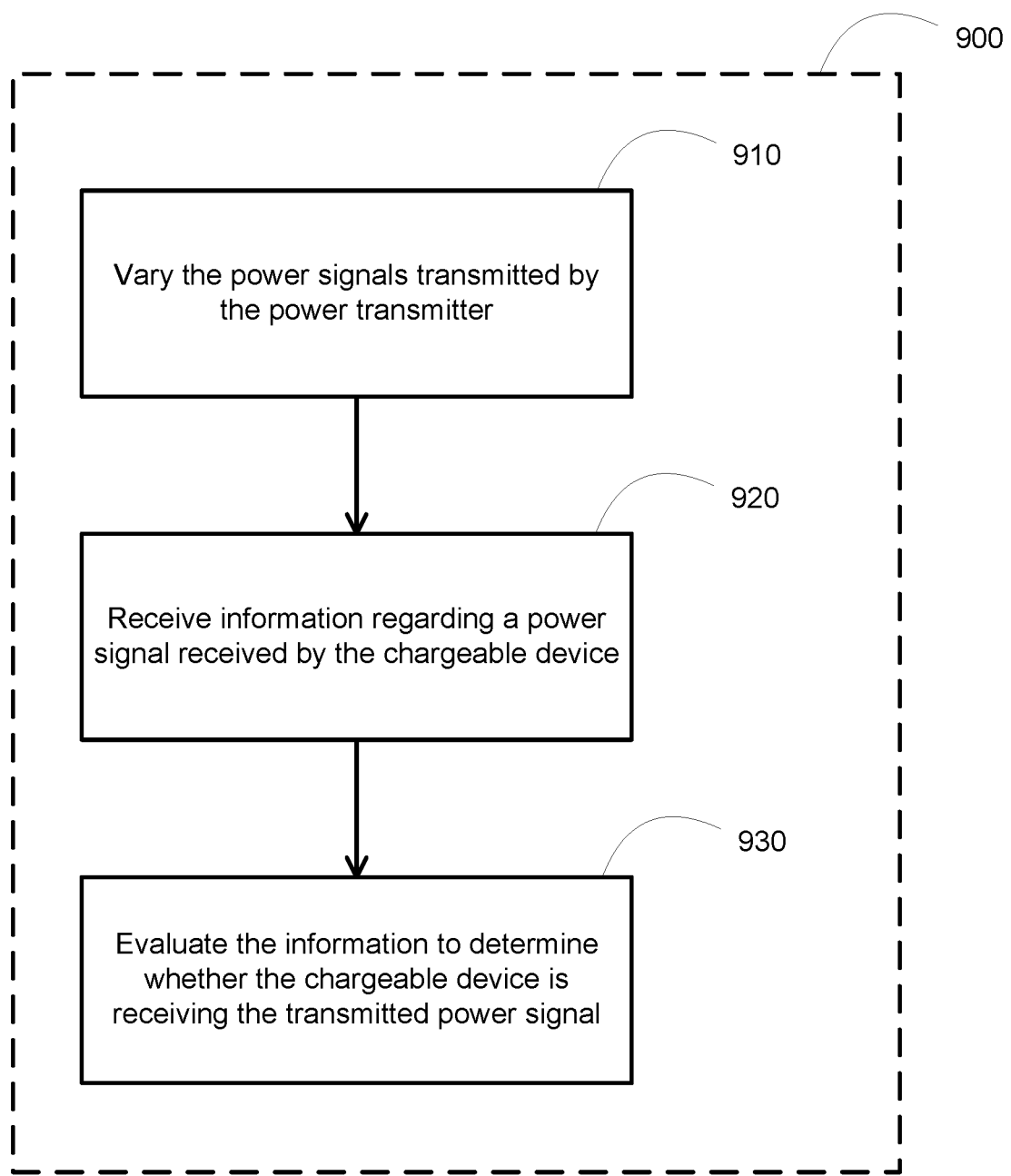
FIG. 9 is a flow diagram of an example first resolution method of facilitating avoidance of cross connection of a chargeable device in communication with a wireless charger in accordance with certain embodiments described herein.

FIG. 9 is a flow diagram of an example first resolution method 900 of facilitating avoidance of cross connection of a chargeable device in communication with a wireless charger in accordance with certain embodiments described herein. In an operational block 910 of the method 900, the power signals (e.g., in-band forward signals) transmitted by the power transmitter 710 can be varied in a manner that is unique to the wireless charger 702 (e.g., uniquely identifies the wireless charger 702 from other wireless chargers). In certain such embodiments, the controller 730 can modulate the amplitude ($I_{tx}$) of power signals transmitted by the power transmitter 710. These modulations can have an amplitude that is sufficiently low so as to not affect power transmission but sufficiently high to be detected by the chargeable device 704. For example, the amplitude of these modulations can be between 0.1% and 10%, between 0.5% and 7%, between 1% and 7%, between 3% and 6%, or between 4% and 5% of the amplitude ($I_{tx}$) of the power signals transmitted by the power transmitter 710. The modulations can have a specific pattern that is recognizable by the chargeable device 704. Examples of differentiation features among modulation patterns include, but are not limited to, shape of the modulation pattern (e.g., square-wave, sine-wave, triangular-wave), duty cycle (e.g., percentage of "on" time vs. "off" time for the modulation), frequency of the modulation, amplitude or depth of modulation, a Manchester coded modulation (e.g., allowing a series of identification bits to be transmitted, or a non-zero-return (NZR) coded modulation (e.g., allowing a series of identification bits to be transmitted).

In an operational block 920 of the method 900, the wireless charger 702 can receive information from the chargeable device 704 regarding power signals received by the chargeable device 704. For example, the wireless charger 702 (e.g., PTU) can query the chargeable device 704 (e.g., PRU) for information regarding the power signals received by the chargeable device 704. The information received from the chargeable device 704 can be indicative of the variations (e.g., modulation amplitude, modulation pattern, encoded identification bits) of the power signals received by the chargeable device 704.

In an operational block 930 of the method 900, the wireless charger 702 can then evaluate the information to determine whether the chargeable device 704 is receiving the transmitted power signals from the wireless charger 702 or from another wireless charger. For example, the wireless charger 702 can determine whether or not the chargeable device 704 (e.g., PRU) is really on the pad of the wireless charger 702 (e.g., PTU). In certain embodiments, the power signals transmitted by the wireless charger 702 are transmitted with a first variation pattern, and evaluating the information comprises comparing a second variation pattern of the power signals received by the chargeable device 704 to the first variation pattern. In certain such embodiments, the wireless charger 702 performs the evaluation of the information and the chargeable device 704 merely reports the second variation pattern of the power signals received by the chargeable device 704. In certain other embodiments, the chargeable device 704 can detect the second variation pattern of the received power signals (e.g., by measuring received voltage or current), and can then compare that second variation pattern against a stored set of acceptable variation patterns. If the variation pattern is an acceptable variation pattern, the chargeable device 704 can then report to the wireless charger 702 a signal indicating which acceptable variation pattern has been detected, and the wireless charger 702 can then compare this reported variation pattern to the first variation pattern (e.g., the variation pattern that the wireless charger 702 actually sent). If there is a match, the connection can be validated. Alternatively, if either Manchester or NRZ encoding is used, the chargeable device 704 can report the actual received bits back to the wireless charger 702 for comparison to the bits that were actually sent by the wireless charger 702. If there is a match, the connection can be validated.

Alternatively, the modulated power signal can be sent constantly (e.g., modulations occur whenever the wireless charger 702 is transmitting power, not just when it is attempting to resolve a cross connection) by the power transmitter 710 to always uniquely identify the power transmitter 710. This first resolution technique can provide the benefit of uniquely identifying a chargeable device 704 that is on a wireless charger 702. This technique is most useful immediately after the chargeable device 704 is turned on; however, this is also the period of time when the powered load is changing its load (e.g., by enabling charge, etc.). Therefore, noise can be introduced into the measurement or detection and may cause a false reject condition. In certain embodiments, an arbitrarily complex code for the modulation can reduce the probability of such false reject conditions. This technique also utilizes an increased range of $V_{reg}$ (e.g., voltage at the chargeable device 704 after the regulator) or $I_{reg}$ (e.g., current at the chargeable device 704 after the regulator) to accommodate the wider ranges of transmitter loop currents ($I_{tx}$), which is related, but not identical, to transmitter power output (e.g., $I_{tx}$, can be modulated to transmit the forward signal). $V_{reg}$ and $I_{reg}$ represent the strength of the received field, and thus the forward modulation of power by the wireless charger 702 will be seen in a variation of $V_{reg}$ and/or $I_{reg}$. The first resolution technique is actually a method of rejecting a cross connection, rather than a method of ensuring a correct connection. Therefore, in an example "stadium" environment, it may take about 52 seconds to achieve a 50% confidence of resolution.

Figure 10A:
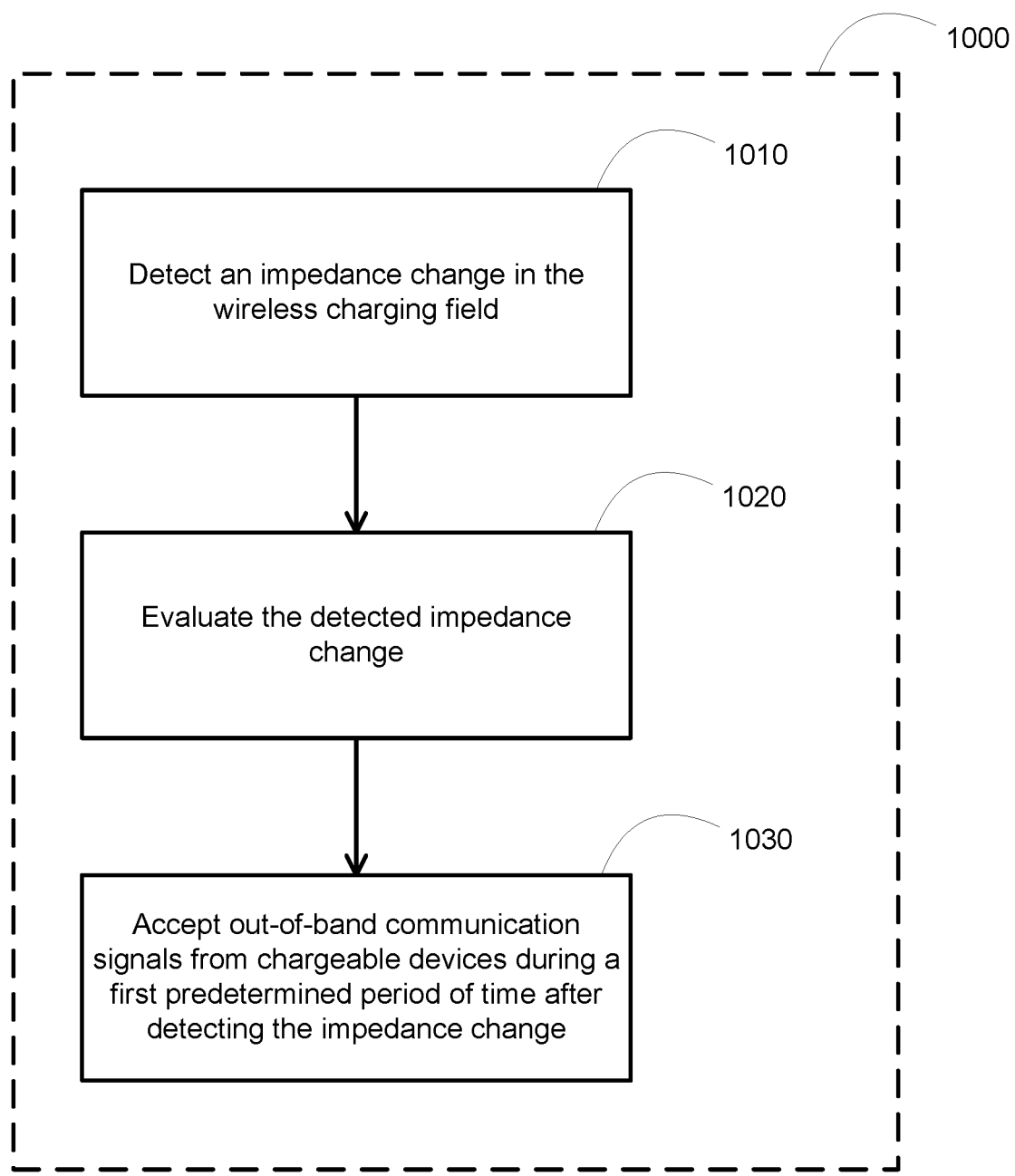
FIG. 10A is a flow diagram of an example of a second resolution method of facilitating avoidance of cross connection of a chargeable device in communication with a wireless charger in accordance with certain embodiments described herein.

FIG. 10A is a flow diagram of an example of a second resolution method 1000 of facilitating avoidance of cross connection of a chargeable device in communication with a wireless charger in accordance with certain embodiments described herein. In an operational block 1010 of the method 1000, the wireless charger 702 detects an impedance change in the wireless charging field due to a chargeable device 704 entering the wireless charging field of the wireless charger 702. In an operational block 1020 of the method 1000, the wireless charger 702 evaluates the detected impedance change to determine whether the detected impedance change has a predetermined attribute. In an operational block 1030 of the method 1000, the wireless charger 702 accepts out-of-band communication signals from chargeable devices during a first predetermined period of time after detecting an impedance change having the predetermined attribute.

In certain embodiments, the controller 730 of the wireless charger 702 can be configured to detect an impedance change in the wireless charging field (e.g., as measured by the transmitter resonator) due to a chargeable device 704 entering the wireless charging field. Evaluating the detected impedance change for the predetermined attribute can comprise comparing the detected impedance change to a predetermined impedance change (e.g., an impedance change expected to be indicative of a chargeable device 704 entering the wireless charging field of the wireless charger 702). For example, the detected impedance change can be deemed to be indicative of a chargeable device 704 entering the wireless charging field (e.g., being placed on the wireless charger 702) if the detected impedance change is greater than a predetermined amount (e.g., j10). In certain embodiments, the controller 730 can allow the wireless charger 702 to accept out-of-band communication signals (e.g., advertisements) from chargeable devices 704 during a first predetermined period of time (e.g., one to 10 seconds) after the controller 730 detects an impedance change in the wireless charging field greater than the predetermined amount. Shorter periods of time can provide more accurate results, but can increase the likelihood that the wireless charger 702 will "miss" the chargeable device 704 due to the times of the impedance change and the out-of-band communication signals not lining up exactly. In this way, the wireless charger 702 can reject out-of-band communications signals from chargeable devices 704 that the controller 703 does not detect in conjunction with an impedance change having the predetermined attribute. Note that the impedance change discussed herein can comprise a change in real (resistive) impedance, a change in imaginary (reactive) impedance, or both.

Figure 10B:
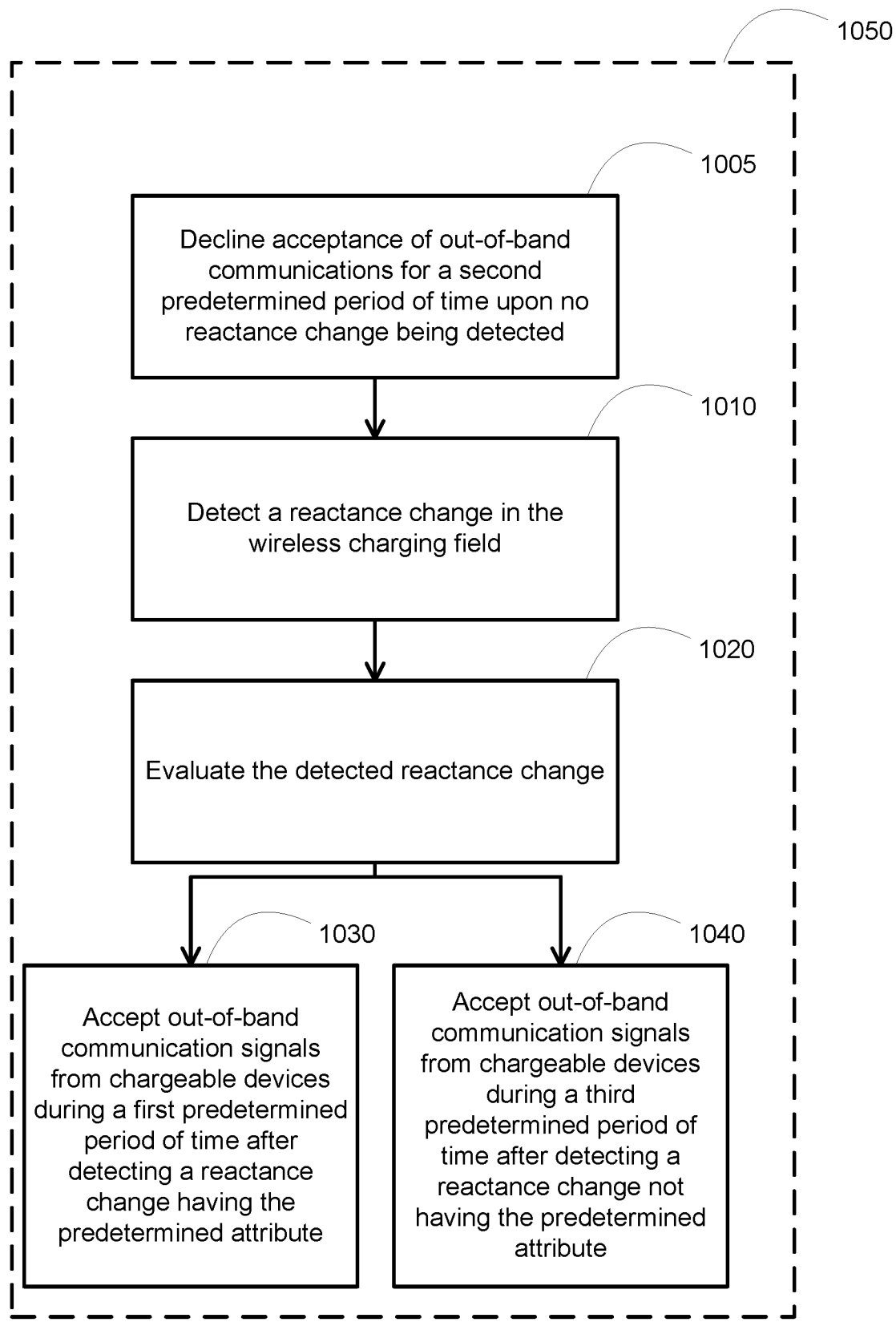
FIG. 10B is a flow diagram of another example of a second resolution method of facilitating avoidance of cross connection of a chargeable device in communication with a wireless charger in accordance with certain embodiments described herein.

FIG. 10B is a flow diagram of another example of a second resolution method 1050 of facilitating avoidance of cross connection of a chargeable device in communication with a wireless charger in accordance with certain embodiments described herein. The method 1050 can be used, for example, in configurations in which the impedance change may not be reliable enough to always be seen by the wireless charger 702 (e.g., due to small chargeable devices 704 creating small impedance changes). In an operational block 1005, the wireless charger 702 can decline accepting out-of-band communication signals (e.g., advertisements) for a second predetermined period of time (e.g., one to 10 seconds) upon no impedance change being detected by the controller 730. In the operational block 1010, an impedance change is detected, and in the operational block 1020, the detected impedance change is evaluated for having the predetermined attribute (e.g., an impedance change greater than 0±j10). If the impedance change has the predetermined attribute, then out-of-band communication signals are accepted in an operational block 1030 during the first predetermined period of time (e.g., one to 10 seconds) after detecting the impedance change. If the impedance change does not have the predetermined attribute, then out-of-band communication signals are accepted in an operational block 1040 during a third predetermined period of time (e.g., one to 10 seconds) after detecting the impedance change, with the third predetermined period of time greater than the first predetermined period of time. In this way, a large chargeable device 704 that causes a large impedance change can be recognized quickly. A small chargeable device 704 that causes a smaller impedance change can then be recognized after the first predetermined period of time, and will potentially go through the usual cross-connection algorithm process.

Figure 11:
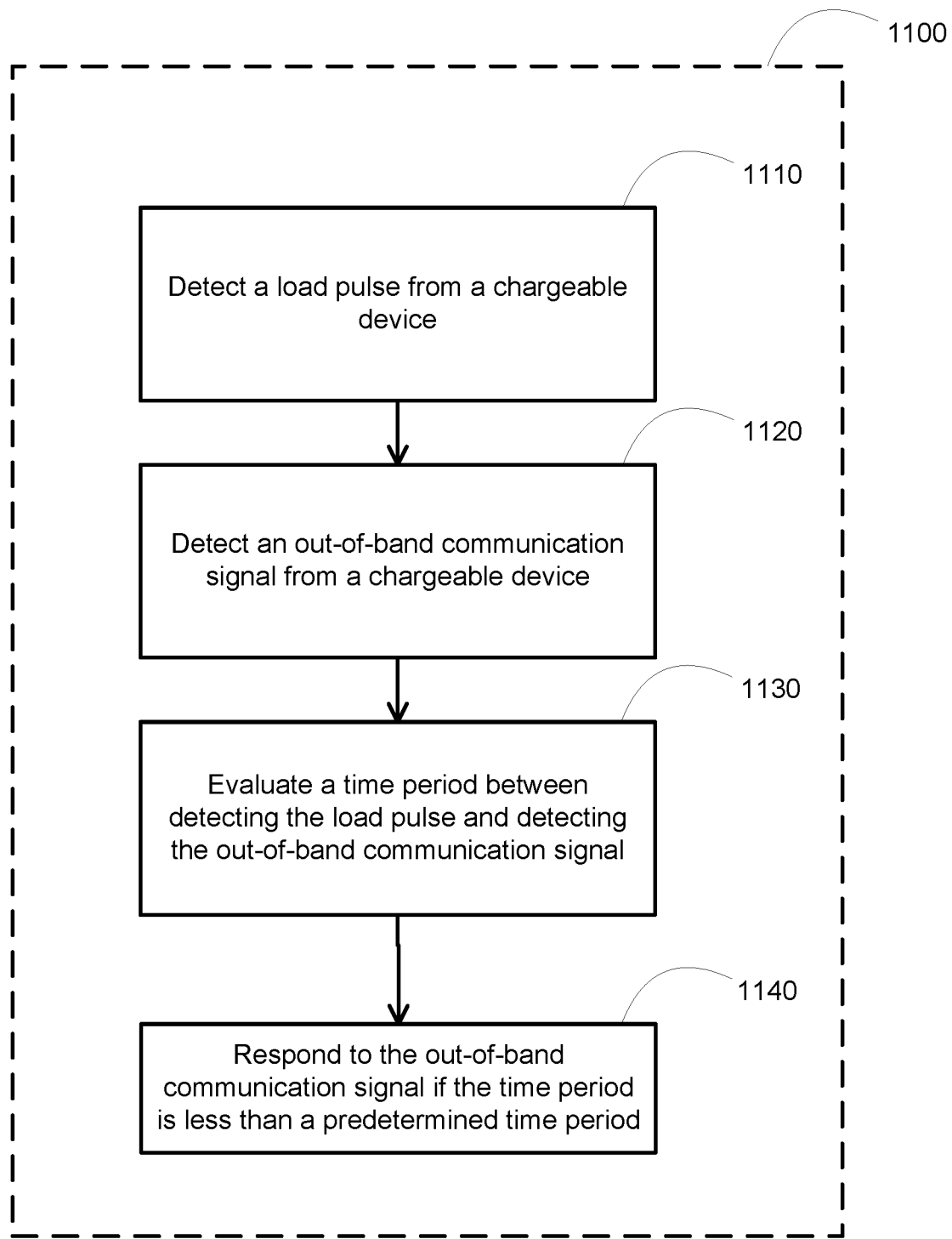
FIG. 11 is a flow diagram of an example of a third resolution method of facilitating avoidance of cross connection of a chargeable device in communication with a wireless charger in accordance with certain embodiments described herein.

FIG. 11 is a flow diagram of an example of a third resolution method 1100 of facilitating avoidance of cross connection of a chargeable device in communication with a wireless charger in accordance with certain embodiments described herein. In an operational block 1110, a load pulse from the chargeable device 704 is detected, and in an operational block 1120, an out-of-band communication signal (e.g., an advertisement) is detected from a chargeable device 704. In an operational block 1130, a time period between detecting the load pulse and detecting the out-of-band communication signal is evaluated. In an operational block 1140, a response to the out-of-band communication signal can be transmitted if the time period is less than a predetermined time period.

In certain embodiments, the controller 730 of the wireless charger 702 is configured to detect a load pulse from the chargeable device 704 (e.g., an impedance modulated reverse link or an in-band reverse signal) and to detect an out-of-band communication signal (e.g., an advertisement) from the chargeable device 704. If the time period between the detection of the load pulse and the out-of-band communication signal is less than the predetermined time period (e.g., 10 ms, 50 ms, 100 ms, 500 ms, 1 second), the load pulse and out-of-band communication signal can be considered to be concurrent with one another and can be indicative of being received from the same chargeable device 704. For example, the chargeable device 704 can be uniquely identified by transmitting a load pulse at the same time as the out-of-band communication signal (e.g., an advertisement) is sent.

The controller 730 can be configured to allow the wireless charger 702 to respond only to advertisements that are accompanied by a load pulse or step (e.g., the advertisement and the load pulse are concurrent with one another, or the time period between detecting the load pulse and the advertisement is less than the predetermined time period). Chargeable devices 704 that do not send coincident advertisements and load pulses are thus ignored by the wireless charger 702.

Since output loads can be unreliable, an additional load can be provided to create a guaranteed increase in the load. For example, instead of just starting to charge the chargeable device and letting the chargeable device provide the load, because such a load can be unreliable, an additional load can be utilized. In certain such embodiments, a chargeable device 704 can be uniquely paired with a wireless charger 702. For example, referring to an example chargeable device 704 as schematically illustrated by FIG. 7C, the chargeable device 704 can comprise a controller 735 configured to generate a load pulse configured to be received by the wireless charger 702.

In certain embodiments, the wireless charger 702 is continually looking for advertisements and load pulses, for example, either a single load pulse/impedance modulation or a train of load pulses/tone burst for impedance modulation. Upon detecting an advertisement and a coincident load pulse (e.g., the advertisement and the load pulse are concurrent with one another, or the advertisement and the load pulse are within the predetermined time period of one another), the wireless charger 702 can accept the connection, can place the chargeable device 704 on a list of accepted (e.g., "here") chargeable devices, and can begin charging the chargeable device 704. If the wireless charger 702 sees a load pulse with no concurrent advertisement, it may be that the chargeable device 704 has not yet booted and is unable to send an advertisement yet. The wireless charger 702 can respond by supplying the transmitter resonator with a nominal charging power level (e.g., Itx_start) for a predetermined period of time (e.g., 30 seconds) (e.g., if it is in power save mode) or by disabling its lost-power algorithm (e.g., as described above) for a predetermined period of time (e.g., 30 seconds) (e.g., if it is in power transfer mode). In this way, the wireless charger 702 can extend the beacon mode time period (e.g., beyond 100 ms) during which the wireless charger 702 is in the nominal charging power level or has its lost-power algorithm disabled, without waiting for the out-of-band communication signal (e.g., advertisement) to allow the chargeable device 704 more time to boot up and begin out-of-band communication. If the wireless charger 702 sees an advertisement with no concurrent load pulse, it can delay by waiting for a predetermined number of advertisements (e.g., 10 advertisements or two beacon pulses, each containing some number of advertisements, such as 5) before responding. Such a condition may be caused by a chargeable device 704 that is too small to provide a load pulse or a chargeable device 704 that is on the pad of another wireless charger 702. The delay can allow the wireless charger 702 upon which the chargeable device 704 resides to complete the connection.

In certain embodiments, the load pulse can be sensed by the wireless charger 702 by monitoring power amplifier (PA) current, which is a continuous sense output that can be monitored via an analog means. In certain other embodiments, the AC power sense subsystem of the wireless charger 702 can also be used to sense the load pulse by looking for a change in the transmitter resonator impedance. The AC power sense subsystem can be considerably more accurate than monitoring PA current.

The load pulse can be generated by the chargeable device 704 either on the AC side of the load or on the DC side of the load. For AC side generation of the load pulse (e.g., creating the impedance modulation with an AC side modulation scheme between the resonator and the rectifiers, such as between blocks 232 and 234 of FIG. 2), one or two FETs can be used, in series with appropriate capacitors, to change the impedance of the tuned receiver circuit in a detectable way. The chargeable device 704 can comprise one or more overvoltage FETs (e.g., in the switching circuitry 512 of the receive circuitry 510) that may be able to create this impedance change, or one or two more FETs elsewhere in the receive circuitry 510 may be used. The FETs could be low output capacitance, low ESR FETs. Advantageously, the diodes can isolate Vreg from the AC section, and thus Vreg will not be "pulled down" by such signaling, thereby allowing normal operation of the devices powered by $V_{reg}$. Also, it is likely that AC load pulsing can be faster (and thus a lower perturbation to the system) and more robust due to ability to change complex impedance. Examples of such circuitry include but are not limited by in-band signaling sensors.

For DC side generation of the load pulse (e.g., creating the impedance modulation with a DC side modulation scheme after the rectifiers, such as after block 234 in FIG. 2), a simple circuit can be used (e.g., a resistor and an NPN transistor). A zener diode and an NPN transistor could also be used, and could have the advantage of providing the maximum DC load possible without causing a dropout by pulling DC voltage below minimum needed for out-of-band communication (e.g., BLE) operation. A pulse train above the frequency of the RC filter formed by the resistor and the storage capacitor (e.g., battery 236 of FIG. 2) can be used to create a specific frequency. The additional spectral content may help with identification of a load pulse.

Figure 12:
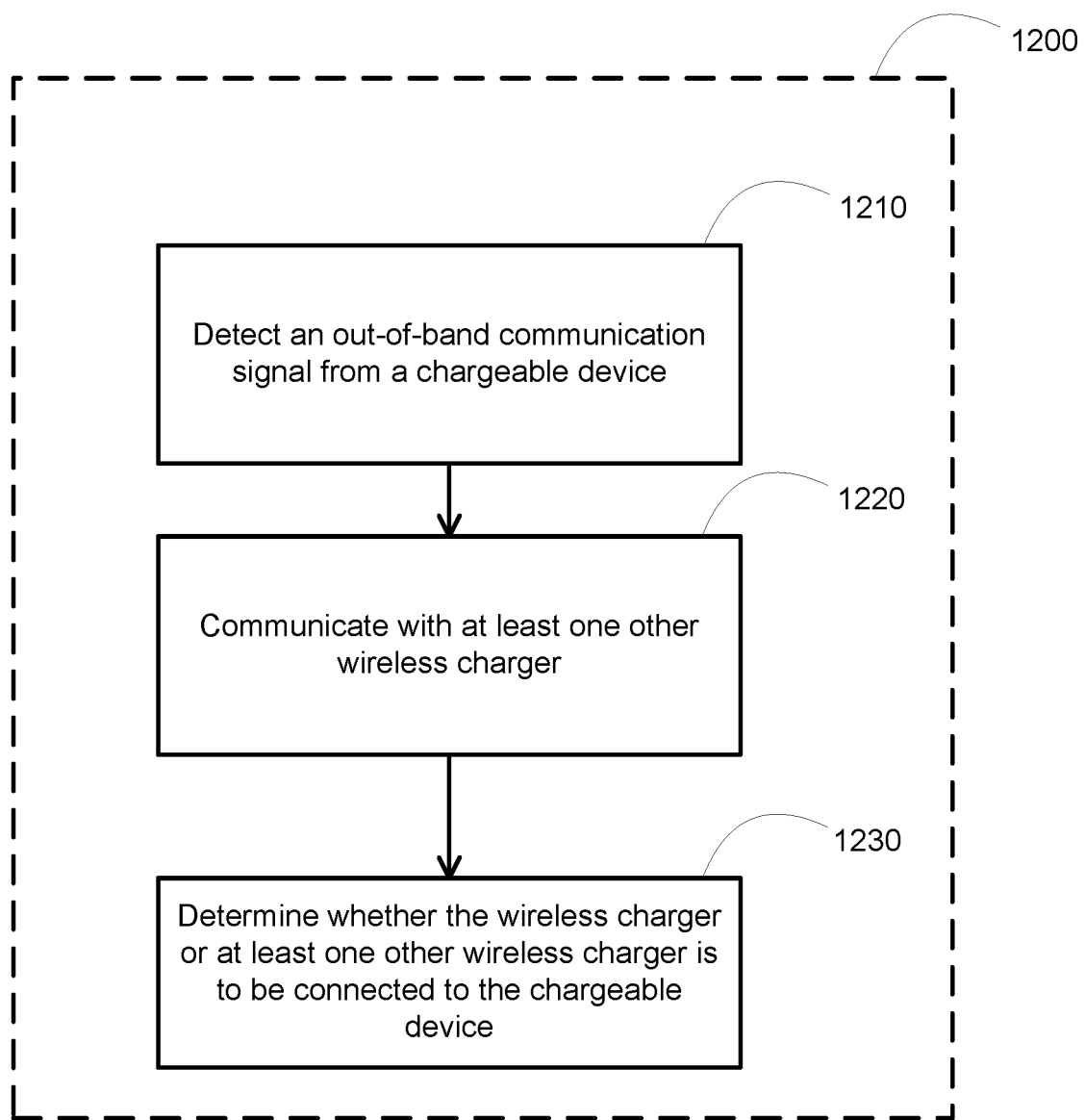
FIG. 12 is a flow diagram of an example of a fourth resolution method of facilitating avoidance of cross connection of a chargeable device in communication with a wireless charger in accordance with certain embodiments described herein.

FIG. 12 is a flow diagram of an example of a fourth resolution method 1200 of facilitating avoidance of cross connection of a chargeable device in communication with a wireless charger in accordance with certain embodiments described herein. In an operational block 1210, the wireless charger 702 receives (e.g., detects) an out-of-band communication signal. In an operational block 1220, upon receiving the out-of-band communication signal, the wireless charger 702 (e.g., controller 730) communicates with at least one other wireless charger. In an operational block 1230, the wireless charger 702 determines whether the wireless charger 702 or the at least one other wireless charger is to be connected to the chargeable device 704 that sent the out-of-band communication signal. In certain embodiments, the received signal strength indication (RSSI) measurements from the various wireless chargers that receive the out-of-band communication signal can be compared, and the wireless charger having the largest RSSI measurement can be connected to the chargeable device. For example, if two wireless chargers 702 receive the same advertisement, they both can communicate with one another and compare the RSSI measurements they each receive in the out-of-band link. The wireless charger 702 having the largest RSSI power level is the one that is allowed to connect to the chargeable device 704.

In addition, any combination of the above resolution methods may be used to facilitate avoidance of cross connection of a chargeable device in communication with a wireless charger. For example, a combination of a signal indicator (e.g., such as the RSSI) and the detection of an impedance change greater than a threshold as described above may be used to reject or accept communication requests. In addition, other combinations of the above resolution methods are contemplated in accordance with the principles described herein.

Figure 13:
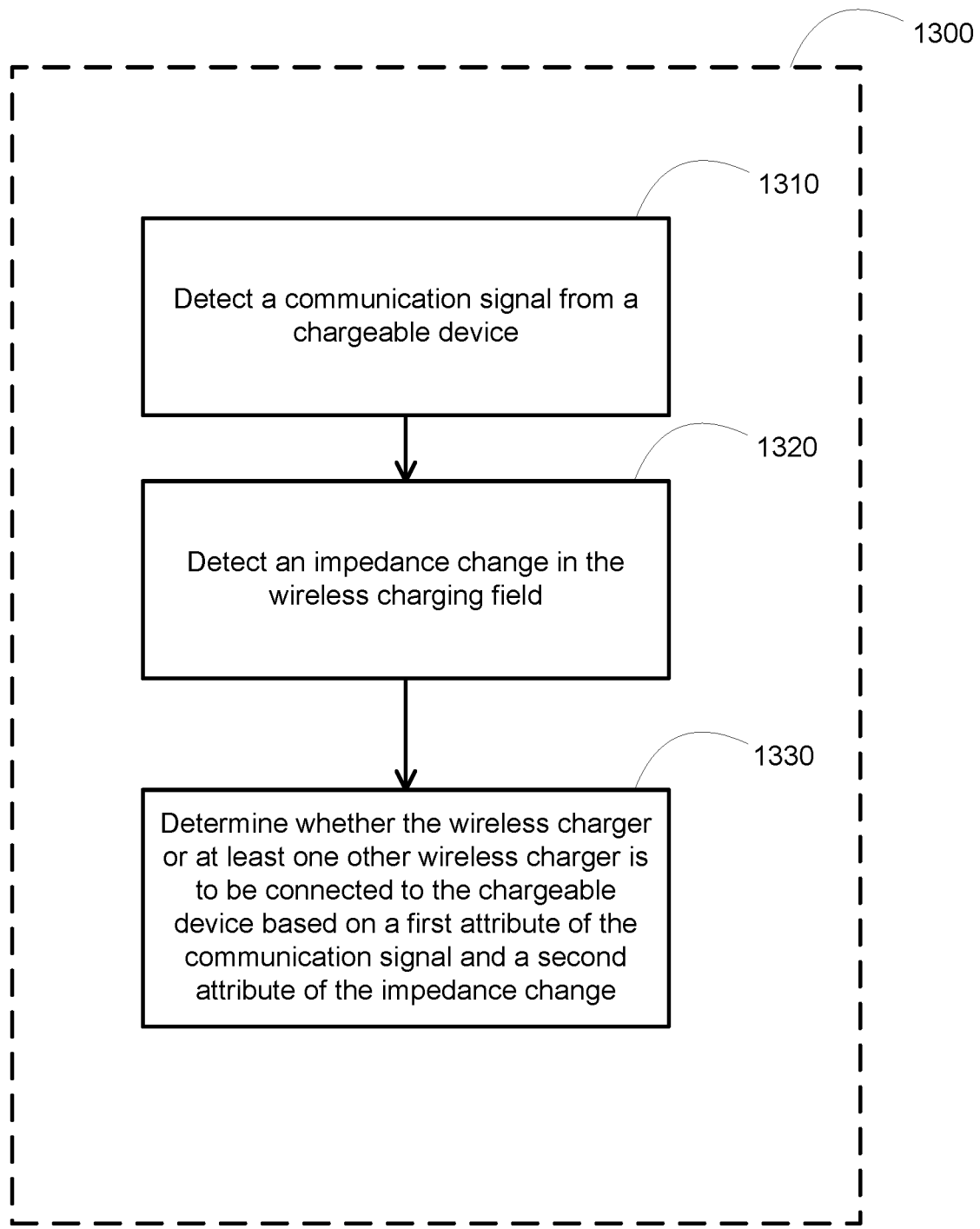
FIG. 13 is a flow diagram of an example of a fifth resolution method of facilitating avoidance of cross connection of a chargeable device in communication with a wireless charger in accordance with certain embodiments described herein.

FIG. 13 is a flow diagram of an example of a fifth resolution method 1300 of facilitating avoidance of cross connection of a chargeable device in communication with a wireless charger in accordance with certain embodiments described herein. In an operational block 1310, a wireless charger 702 receives (e.g., detects) a communications signal from a chargeable device 704. In an aspect, the communications signal from the chargeable device 704 may be an out-of-band signal such as a Bluetooth advertisement as described above or another type of signal. At an operational block 1320, the wireless charger 702 detects an impedance change in the wireless charging field, for example, as described above with reference to FIGS. 10A and 10B.

At an operational block 1330, the wireless charger 702 determines whether the wireless charger 702 or at least one other wireless charger is to be connected to the chargeable device (e.g., whether the wireless charger 702 or at least one other wireless charger is to accept communication signals from the chargeable device) based on a first attribute of the communication signal and a second attribute of the impedance change. For example, the wireless charger 702 may measure the RSSI of the communication signal received from the chargeable device 704 as described above and may determine whether the RSSI is above a threshold (e.g., first attribute). Furthermore, the wireless charger 702 may determine an amount of the impedance change and determine whether the amount of the impedance change is above a threshold (e.g., second attribute). The wireless charger 702 may determine to establish a communication link with the chargeable device 704 that sent the communication signal if the RSSI is above the threshold and the impedance change is above a threshold. Furthermore, the wireless charger 702 may determine to establish a communication link if the RSSI is above a threshold and an impedance shift received within a first period of time (e.g., some threshold period of time) before or after receiving the communication signal is above a threshold. The wireless charger 702 may determine to accept communications based one or both of these.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communication between a chargeable device and a wireless charger, the method comprising:
   detecting an impedance change in at least one charging region of a wireless charging field generated by the wireless charger, the impedance change caused by introducing the chargeable device to the wireless charging field;
   determining the detected impedance change has a predetermined attribute indicative of one or more chargeable devices entering the wireless charging field of the wireless charger;
   detecting a communication signal from the chargeable device during a first predetermined period of time relative to detecting the impedance change having the predetermined attribute; and
   accepting the communication signal based on the communication signal being detected during the first predetermined period of time relative to detecting the impedance change.

2. The method of claim 1, wherein the predetermined attribute comprises an impedance change greater than a predetermined amount.

3. The method of claim 1, wherein the predetermined period of time is in a range of one second to 10 seconds.

4. The method of claim 1, further comprising establishing a communication link with the chargeable device based on the communication signal being detected during the first predetermined time relative to detecting the impedance change.

5. The method of claim 4, wherein the communication link is established when a received signal strength indication (RSSI) of the communication signal is larger than a predetermined threshold.

6. The method of claim 1, further comprising declining accepting communication signals for a second period of time upon no impedance change being detected.

7. The method of claim 1, further comprising generating a plurality of power signals by modulating the wireless charging field by an amplitude that is sufficiently low so as to not affect power transmission but sufficiently high to be detected by the chargeable device.

8. The method of claim 7, wherein modulating the wireless charging field comprises modulating the wireless charging field in a pattern that is unique to the wireless charger.

9. The method of claim 1, further comprising detecting whether the detected impedance change from the chargeable device and an advertisement from the chargeable device are concurrent with one another.

10. The method of claim 1, further comprising accepting communication signals during a second predetermined period of time relative to detecting an impedance change not having the predetermined attribute.

11. The method of claim 10, wherein the second predetermined period of time is greater than the first predetermined period of time.

* * * * *